(12) United States Patent
Humphreys et al.

(10) Patent No.: US 12,415,959 B2
(45) Date of Patent: Sep. 16, 2025

(54) UPGRADING RESIDUES, HEAVY OILS AND PLASTICS

(71) Applicant: Ignite Energy Resources Limited, Melbourne (AU)

(72) Inventors: Leonard James Humphreys, Roseville Chase (AU); William Neil Rowlands, Alexandria (AU)

(73) Assignee: Ignite Energy Resources Limited, Melbourne (AU)

( * ) Notice: Subject to any disclaimer, the term of this patent is extended or adjusted under 35 U.S.C. 154(b) by 0 days.

(21) Appl. No.: 17/141,118

(22) Filed: Jan. 4, 2021

(65) Prior Publication Data
US 2021/0207035 A1  Jul. 8, 2021

Related U.S. Application Data

(63) Continuation of application No. 16/711,079, filed on Dec. 11, 2019, now abandoned, which is a
(Continued)

(30) Foreign Application Priority Data

Jun. 11, 2015 (AU) ................................ 2015902210
Oct. 22, 2015 (AU) ................................ 2015904339

(51) Int. Cl.
*C10G 1/10* (2006.01)
*C10G 1/06* (2006.01)
(Continued)

(52) U.S. Cl.
CPC ............... *C10G 1/10* (2013.01); *C10G 1/065* (2013.01); *C10G 9/00* (2013.01); *C10G 31/06* (2013.01);
(Continued)

(58) Field of Classification Search
CPC . C10G 1/10; C10G 1/06; C10G 31/06; C10G 31/08; C10G 53/02; C10G 9/00; C10G 55/04
See application file for complete search history.

(56) References Cited

U.S. PATENT DOCUMENTS 4,334,976 A   6/1982  Yan
6,107,532 A   8/2000  Saito et al.
(Continued)

FOREIGN PATENT DOCUMENTS

CA     2220800      * 11/1997    ............. C10G 31/08
CA     2220800 A1   11/1998
(Continued)

OTHER PUBLICATIONS

Xiu et al. (Bio-oil production and upgrading research: A review, 2012, Renewable and Sustainable Energy Reviews, 16 (2012) 4406-4414) (Year: 2012).*
(Continued)

*Primary Examiner* — Youngsul Jeong
(74) *Attorney, Agent, or Firm* — Wood, Phillips, Katz, Clark & Mortimer

(57) ABSTRACT

The present invention relates to upgrading heavy petroleum oils, their residues, and/or polymeric materials. More specifically the present invention relates to a method for upgrading heavy petroleum oils, their residues, and/or polymeric materials by hydrothermal treatment with an aqueous solvent.

16 Claims, 12 Drawing Sheets

Related U.S. Application Data continuation-in-part of application No. 15/735,329, filed as application No. PCT/AU2016/000197 on Jun. 10, 2016, now abandoned.

(51) Int. Cl.
  *C10G 9/00* (2006.01)
  *C10G 31/06* (2006.01)
  *C10G 31/08* (2006.01)
  *C10G 31/10* (2006.01)
  *C10G 53/02* (2006.01)
  *C10G 55/04* (2006.01)

(52) U.S. Cl.
  CPC ............ *C10G 31/08* (2013.01); *C10G 31/10* (2013.01); *C10G 53/02* (2013.01); *C10G 55/04* (2013.01); *C10G 2300/302* (2013.01); *C10G 2300/308* (2013.01); *Y02P 30/20* (2015.11)

(56) References Cited

U.S. PATENT DOCUMENTS 8,057,666 B2 * 11/2011 Allan ............... B01J 8/1836
  219/628
8,083,900 B2 * 12/2011 Lin ................... C10G 1/02
  201/23
2010/0329938 A1   12/2010 Allan et al.
2013/0192123 A1   8/2013 Maschmeyer et al.
2013/0276361 A1   10/2013 Maschmeyer

FOREIGN PATENT DOCUMENTS

EP         2774972 B1 * 12/2019 ........... C07C 29/147
WO     2008/115230 A1    9/2008
WO     WO-2014197928 A1 * 12/2014 ........... B01J 19/002

OTHER PUBLICATIONS

Xiu et al. (Bio-oil production and upgrading research: A review, Renewable and Sustainable Energy Reviews 16 (2012) 4406-4414) (Year: 2012).*

European Patent Office Search Report for corresponding Application No. PCT/AU2016/000197 dated Nov. 27, 2018.

International Search Report for corresponding PCT Application No. PCT/US2016/000197 mailed Oct. 3, 2017.

International Preliminary Report on Patentability for corresponding PCT Application No. PCT/AU2016/000197 mailed Oct. 3, 2017.

* cited by examiner

FIGURE 8C
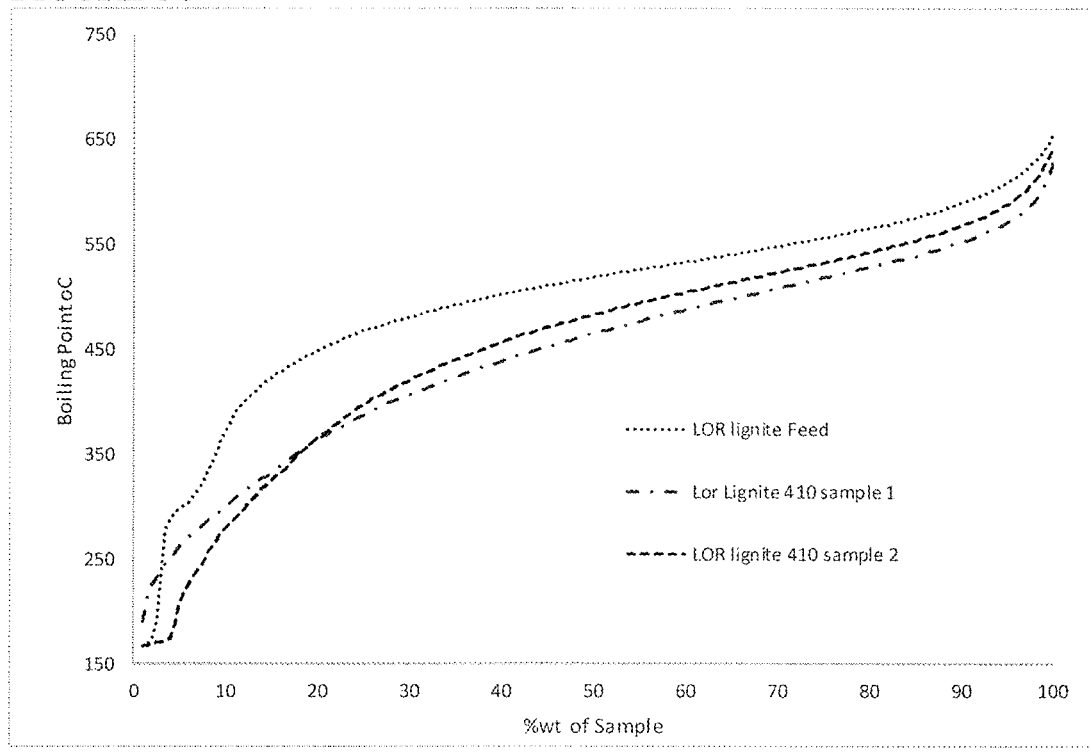
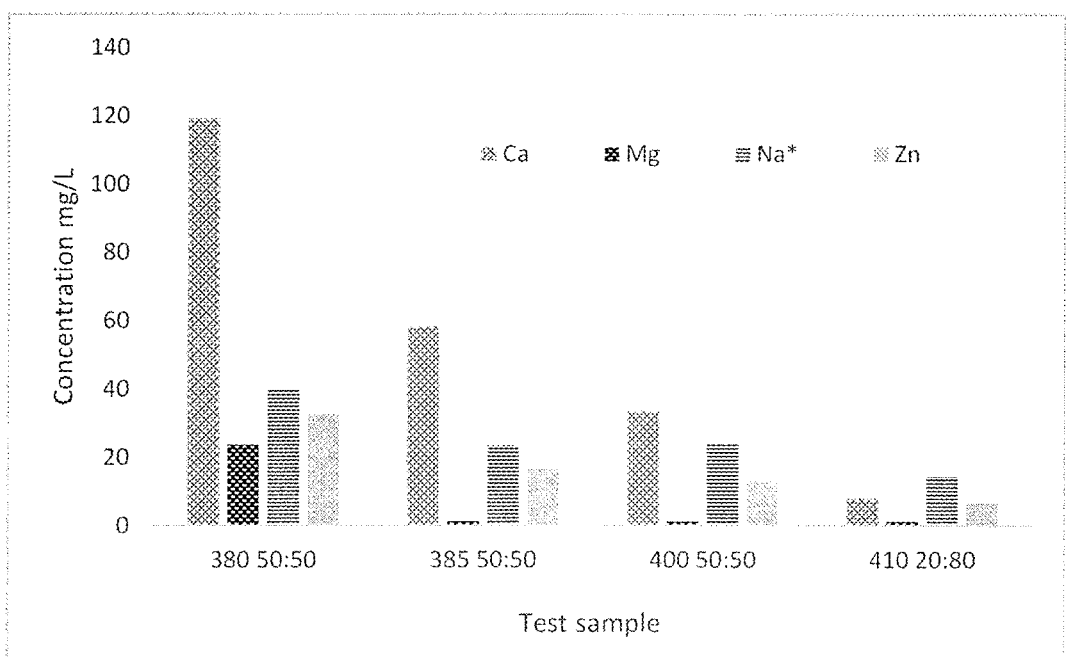
FIGURE 9

UPGRADING RESIDUES, HEAVY OILS AND PLASTICS

INCORPORATION BY CROSS-REFERENCE

The present application claims priority from U.S. patent application Ser. No. 16/711,079 filed on 11 Dec. 2019, which is a continuation of U.S. patent application Ser. No. 15/735,329 filed on 11 Dec. 2017, which is a U.S. National Phase of International Application PCT/AU2016/000197 filed on 10 Jun. 2016, and which claims priority from Australian provisional patent application number 2015902210 filed on 11 Jun. 2015 and Australian provisional patent application number 2015904339 filed on 22 October 2015. The entire content of each application from which the present application claims priority is incorporated herein by cross-reference.

TECHNICAL FIELD

The present invention relates to upgrading heavy petroleum oils, their residues, and/or polymeric materials. More specifically the present invention relates to a method for upgrading heavy petroleum oils, their residues, and/or polymeric materials by hydrothermal treatment with an aqueous solvent.

BACKGROUND

As light crude reservoirs become scarce and long term oil prices continue to rise, much effort has focused on alternative sources such as the generation of bio-oils from natural feedstocks (e.g. plant material) and waste materials (e.g. sewerage, municipal waste etc.).

Plastic waste material is poorly biodegradable and represents an increasing environmental problem. The majority of plastic waste is still used in landfill meaning that a significant amount of processed raw material and energy is lost/not utilised. Methods capable of converting plastic waste into biofuels or other valuable products would thus offer a solution to the issue of accumulating plastic wastes as well as an alternative to fossil fuel utilisation.

An opportunity also exists to re-refine used oils to a quality suitable for additional use. While some technologies have been moderately successful in this endeavour, in many cases heavier oil components and residues remain as waste and in general current processes and refineries are inefficient in re-refining heavy and extra heavy crude oils.

For example, lube oil is a commonly used product designed to perform several functions including the lubrication of moving machinery parts as well as cooling, cleaning and corrosion control. However, after a certain amount of usage, lube oil becomes unfit for further use due to the accumulation of contaminants and chemical changes in the oil. The main contaminants include combustion products (e.g. water, soot and carbon, lead, fuel), abrasives (e.g. road dust, wear metals), and chemical products (e.g. oxidation products, depleted additive remnants).

To re-refine the oil, it is necessary to remove the aforementioned contaminants and restore the oil to its original condition. This can be achieved first through dehydration and then diesel stripping. The diesel stripping is a vacuum distillation process that extracts the different fractions including light fuel or diesel; lubricating oil; and lube oil residue (LOR). The LOR makes up the non-distillable part of the feedstock and is the only fraction of the three that is, for the most part, considered useless for commercial applications though it has been used successfully as bitumen extender in roads. It contains all of the carbon, wear metals, and degraded additives as well as most of the lead and oxidation products. Many heavy residue equivalents of LOR exist in other used oil products, and these are generally of limited value and usefulness.

A need exists for improved methods capable of upgrading heavy oils and residues into more valuable fuel products. More specifically, a need exists for methods capable of upgrading heavy oils and residues into fuel products exhibiting any one or more of reduced viscosity, increased specific gravity, lower boiling temperature and/or an increased capacity for distillation. A need also exists for improved methods capable of converting plastic waste into biofuel and/or other products.

SUMMARY OF THE INVENTION

The present invention meets at least one of the needs set out above, and relates to at least the following embodiments:

Embodiment 1; A method for upgrading heavy oil or heavy oil residue, the method comprising the stages of:
  treating a mixture of the oil and an aqueous solvent at a temperature of more than 370° C. and at a pressure of more than 20 bar for a suitable time period, and
  depressurizing the mixture to obtain an upgraded product, wherein the upgraded product has any one or more of a lower boiling point, reduced viscosity, lower specific gravity, and/or lower density compared to the heavy oil.

Embodiment 2; The method according to embodiment 1, wherein the heavy oil has a viscosity of more than 100 centipoise, more than 200 centipoise, more than 1000 centipoise, more than 5,000 centipoise, more than 10,000 centipoise, more than 100,000 centipoise, or more than 1,000,000 centipoise at 40° C.

Embodiment 3; The method according to embodiment 1 or embodiment 2, wherein the heavy oil has an API (American Petroleum Institute) gravity of less than 25°, less than 20°, less than 15°, less than 10°, less than 5°, less than 4°, less than 3°, or less than 2°.

Embodiment 4; The method according to any one of embodiments 1 to 3, wherein the atmospheric equivalent boiling point (AEBP) of the heavy oil is more than 300° C., more than 350° C., more than 400° C., more than 450° C., more than 500° C., or more than 550° C.

Embodiment 5; The method according to any one of embodiments 1 to 4, wherein the heavy oil comprises re-refined Vacuum Tower Bottoms (RVTB), waste engine oil residue (WEOR), waste engine oil (WEO) residue, waste oil distillation bottoms (WODB), re-refined heavy vacuum distillation oil (RHVDO), asphalt flux, Processed Fuel Oil (PFO) sludge by-products of the production of Processed Fuel Oil (PFO) from waste oils, heavy oil residue of re-refined oil, heavy oil residue from distillation of coal, heavy oil residue from distillation of liquid or tar derived from processing coal, heavy oil and/or tar derived from hydrothermal processing of lignite or sub-bituminous coal or peat, distillation residues of products from hydrothermal processing of lignite or sub-bituminous coal, distillation residues of products from hydrothermal processing of biomass, lube oil residue (LOR), or any combination thereof.

Embodiment 6; The method according to any one of embodiments 1 to 5, wherein the heavy oil comprises bitumen, tar/oil sands, oil shale, shale oil, plant oil, or any combination thereof.

Embodiment 7; The method according to any one of embodiments 1 to 6, wherein the heavy oil comprises used oil, used lubricating oil, used motor oil, used transformer oil, used cooking oil, heavy oil residue of re-refined oil, heavy oil residue from distillation of coal, heavy oil residue from distillation of liquid or tar derived from processing coal, oil and/or tar derived from hydrothermal processing of lignite or sub-bituminous coal or peat, distillation residues of products from hydrothermal processing of lignite or sub-bituminous coal, distillation residues of products from hydrothermal processing of biomass, or any combination thereof.

Embodiment 8; The method according to any one of embodiments 1 to 7, wherein the mixture comprises any one or more of lignite, lignocellulosic biomass, plant gum, plant resin, plant tar, plant pitch, or any combination thereof.

Embodiment 9; The method according to any one of embodiments 1 to 8, wherein the temperature is between 370° C. and 500° C., between 370° C. and 480° C., between 374° C. and 500° C., 380° C. and 500° C., between 380° C. and 450° C., between 400° C. and 480° C., or between 440° C. and 480° C.

Embodiment 10; The method according to any one of embodiments 1 to 9, wherein the wherein the pressure is:
(i) between 20 bar and 400 bar;
(ii) between 40 bar and 300 bar;
(iii) above 200 bar; or
(iv) above 221 bar.

Embodiment 11; The method according to any one of embodiments 1 to 10, wherein the mixture is a slurry or emulsion under continuous flow during said treating.

Embodiment 12; The method according to any one of embodiments 1 to 11, wherein the mixture comprises an additive catalyst selected from the group consisting of: a base catalyst; an acid catalyst; a water-gas-shift catalyst; an alumino-silicate catalyst; a sulphide catalyst; and any combination thereof, wherein the additive catalyst is not derived from: any other component of the mixture or a reactor apparatus component.

Embodiment 13; The method according to embodiment 12, wherein the additive catalyst is selected from the group consisting of sodium hydroxide, potassium hydroxide, sodium carbonate, potassium carbonate, sodium formate, potassium formate, an iron salt, or any combination thereof.

Embodiment 14; The method according to any one of embodiments 1 to 13, wherein the additive catalyst is added to the mixture after the mixture has been heated to more than 300° C., more than 350° C., more than 360° C., more than 370° C., or more than 374° C.

Embodiment 15; The method according to any one of embodiments 1 to 14, wherein the additive catalyst is added to the mixture after the mixture has been pressurised to more than 50 bar, more than 100 bar, more than 150 bar, or more than 200 bar, or more than 221 bar.

Embodiment 16; The method according to any one of embodiments 1 to 15, comprising:
(i) heating and pressuring the aqueous solvent to supercritical temperature and pressure; and
(ii) contacting the heavy oil with the supercritical aqueous solvent to form the mixture.

Embodiment 17; The method according to any one of embodiments 1 to 16, wherein the mixture comprises a solid substrate that is either or both of:
(i) solid or substantially solid at the temperature and the pressure;
(ii) inert or substantially inert at the temperature and the pressure.

Embodiment 18; The method according embodiment 17, wherein the solid substrate is:
(i) a carbonaceous material comprising at least 50%, at least 60%, at least 70%, at least 80%, or at least 90% by weight carbon; or
(ii) is a non-carbonaceous material comprising no more than 10%, no more than 5%, no more than 1%, or no carbon.

Embodiment 19; The method according to embodiment 17 or embodiment 18, wherein the solid substrate is selected from the group consisting of; coals, anthracitic coal, meta-anthracite, anthracite semianthracite, bituminous coal, sub-bituminous coal, lignite (i.e. brown coal), coking coal, coal tar, coal tar derivatives, coal char, coke, high temperature coke, foundry coke, low and medium temperature coke, pitch coke, petroleum coke, coke oven coke, coke breeze, gas coke, brown coal coke, semi coke, charcoal, pyrolysis char, hydrothermal char, carbon black, graphite fine particles, amorphous carbon, carbon nanotubes, carbon nanofibers, vapor-grown carbon fibers, fly ash, a mineral, calcium carbonate, calcite, a silicate, silica, quartz, an oxide, a metal oxide, an insoluble or substantially insoluble metal salt, iron ore, a clay mineral, talc, gypsum, carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium.

Embodiment 20; The method according to any one of embodiments 17 to 19, wherein the solid substrate is present in the mixture at a concentration of more than 0.5%, more than 1%, more than 3%, more than 5%, more than 10%, more than 15%, more than 20%, more than 25%, or more than 30% by weight.

Embodiment 21; The method according to any one of embodiments 1 to 20, wherein gases released during said depressurizing are used as syngas for production of hydrocarbons.

Embodiment 22; The method according to any one of embodiments 1 to 21, wherein polar and non-polar liquids in the upgraded product are separated by distillation followed by physical means.

Embodiment 23; The method according to embodiment 22, wherein the distillation is fractional distillation and the physical means are any one or more of decantation, centrifugation or gravitational means.

Embodiment 24; The method according to any one of embodiments 1 to 23 comprising recycling the upgraded product or a component thereof into the heavy oil prior to said treating.

Embodiment 25; The method according to embodiment 24, wherein the component thereof is heavy oil residue generated from distillation of the upgraded product.

Embodiment 26; The method according to any one of embodiments 1 to 25, wherein the upgraded product has a viscosity that is at least 50 centipoise lower, at least 100 centipoise lower, at least 200 centipoise lower, at least 500 centipoise lower least 1,000 centipoise lower, at least 1,500 centipoise lower, at least 2,000 centipoise lower, at least 3000 centipoise lower, at least 4,000 centipoise lower, or at least 5,000 centipoise lower, or at least 10,000 centipoise lower or at least 50,000 centipoise lower than the viscosity of the heavy oil at 40° C.

Embodiment 27; The method according to any one of embodiments 1 to 26, wherein the upgraded product has an API gravity that is at least 1°, at least 2°, at least 5°, at least 10°, at least 15°, or at least 20° higher than the API gravity of the heavy oil.

Embodiment 28; The method according to any one of embodiments 1 to 27, wherein the upgraded product has an AEBP that is at least 20° C., at least 30° C., at least 40° C., at least 250° C., at least 60° C., at least 70° C., at least 80° C., at least 90° C., at least 100° C., at least 150° C., or at least 200° C. lower than the AEBP of the heavy oil.

Embodiment 29; The method according to any one of embodiments 1 to 28, wherein the upgraded product has a density that is at least 0.5%, at least 1%, at least 2%, at least 5%, at least 10%, at least 15%, or at least 20% lower than the density of the heavy oil when measured at the same temperature between 15° C. and 60° C.

Embodiment 30; The method according to any one of embodiments 1 to 29, wherein the proportion of the upgraded product capable of being distilled is at least 5%, at least 10%, at least 15%, at least 20%, at least 25%, at least 30%, at least 40%, at least 50%, at least 60%, at least 70%, at least 80% or at least 90% more than the proportion of the heavy oil capable of being distilled.

Embodiment 31; The method according to any one of embodiments 1 to 30, wherein the heavy oil constitutes at least 5% wt/wt, at least 10% wt/wt, at least 15% wt/wt, at least 20% wt/wt, at least 25% wt/wt, at least 30% wt/wt, at least 40% wt/wt, at least 50% wt/wt, at least 60% wt/wt, at least 70% wt/wt, at least 80% wt/wt, at least 90% wt/wt, at least 95% wt/wt, at least 96% wt/wt, at least 97% wt/wt, at least 98% wt/wt, or at least 99% wt/wt, of the mixture during said treating.

Embodiment 32; The method according to any one of embodiments 1 to 31, wherein the mixture comprises at least; 1% wt/wt, 2% wt/wt, 3% wt/wt, 4% wt/wt, 5% wt/wt, 10% wt/wt, 15% wt/wt, 20% wt/wt, 25% wt/wt, 30% wt/wt, 35% wt/wt, 40% wt/wt, 45% wt/wt, 50% wt/wt, 60% wt/wt, 70% wt/wt, 80% wt/wt, 90% wt/wt, 95% wt/wt, or 98% wt/wt, polymeric material.

Embodiment 33; The method according to any one of embodiments 1 to 31, wherein the mixture comprises less than; 98% wt/wt, 95% wt/wt, 90% wt/wt, 80% wt/wt, 70% wt/wt, 60% wt/wt, 50% wt/wt, 45% wt/wt, 40% wt/wt, 35% wt/wt, 30% wt/wt, 25% wt/wt, 20% wt/wt, 15% wt/wt, 10% wt/wt, 5% wt/wt, 4% wt/wt, 3% wt/wt, 2% wt/wt, or 1% wt/wt, polymeric material.

Embodiment 34; The method according to embodiment 32 or embodiment 33, wherein the polymeric material is selected from the group consisting of Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly-(vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly(Phenol-formaldehyde) (PF), Epoxies, Polyacetal, (Acetal), Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), poly condensate, Polyetheretherketone (PEEK), Polyethersulfone (PES), Polyethylenechlorinates, (PEC), Polyimide, (PI), Polymethylpentene (PMP), Poly (phenylene Oxide) (PPO), Polyphenylene Sulfide (PPS), Polyphthalamide, (PTA), Polysulfone (PSU), Polyurethane, (PU), Poly(vinylidene chloride) (PVDC), Poly(tetrafluoroethylene) PTFE, Poly(fluoroxy alkane) PFA, Poly(siloxanes), silicones, thermoplastics, thermosetting polymers, natural rubbers, tyre rubbers, ethylene propylene diene monomer rubbers EPDM, chloroprene rubbers, acrylonitrile butadiene (nitrile) rubbers, polyacrylate rubbers, Ethylene Acrylic rubbers, Styrene-butadiene rubbers, Polyester urethane rubbers, Polyether urethane rubbers, Fluorosilicone rubbers, silicone rubbers, and copolymers and mixtures thereof.

Embodiment 35; The method according to any one of embodiments 32 to 34, wherein the polymeric material comprises any one or more of:
less than about 5% w/w nitrogen, less than about 1% w/w nitrogen, less than about 0.5% w/w nitrogen, or less than about 0.1% w/w nitrogen;
less than about 1% w/w total halogens, less than about 1% w/w total halogens, less than about 0.5% w/w total halogens, less than about 0.1% w/w total halogens, or less than about 0.05% total halogens;
a molar ratio of hydrogen to carbon (H/C) of greater than 2.15, greater than 2.0, greater than 1.8, greater than 1.6, greater than 14, greater than 1.2, greater than 1.0, or greater than 0.8.

Embodiment 36; The method according to any one of embodiments 32 to 35, wherein the polymeric material is ground prior to inclusion in the mixture.

Embodiment 37; The method according to any one of embodiments 32 to 36, wherein mixture is emulsified after inclusion of the polymeric material.

Embodiment 38; The method according to any one of embodiments 1 to 37, wherein: the temperature is between about 370° C. and 480° C. and the pressure is between 40 bar and 300 bar;
the temperature is between about 380° C. and 450° C. and the pressure is between 40 bar and 300 bar;
the temperature is between about 390° C. and 410° C. and the pressure is between 40 bar and 300 bar; or
the temperature is about 400° C. and the pressure is between 40 bar and 300 bar. Embodiment 39; The method according to any one of embodiments 1 to 38, wherein the temperature is between about 390° C. and 430° C. and the heavy oil residue comprises or consists of lubricating oil residue (LOR).

Embodiment 40; The method according to any one of embodiments 1 to 39, wherein the temperature is between about 420° C. and 460° C. and the mixture comprises:
any one or more of lignite, lignocellulosic biomass, plant gum, plant resin, plant tar, plant pitch, or any combination thereof; and/or
polymeric material (e.g. polyethylene).

Embodiment 41; The method according to any one of embodiments 1 to 40, wherein the suitable time period is less than about; 60 minutes, 45 minutes, 30 minutes, 25 minutes, 20 minutes, 15 minutes, 10 minutes or 5 minutes; more than about; 60 minutes, 45 minutes, 30 minutes, 25 minutes, 20 minutes, 15 minutes, 10 minutes, 5 minutes or 2 minutes; or between about; 1 minute and 60 minutes, 5 minutes and 45 minutes, 5 minutes and 35 minutes, 10 minutes and 35 minutes, 15 minutes and about 30 minutes, or 20 minutes and 30 minutes.

Embodiment 42; A method for converting a polymeric feedstock into a product, the method comprising the stages of:
treating a mixture of the polymeric feedstock and an aqueous solvent at a temperature of more than 370° C. and at a pressure of more than 20 bar for a suitable time period, and
depressurizing the mixture to obtain a product,
wherein the product comprises bio oil.

Embodiment 43; The method according to embodiment 42, wherein the mixture comprises any one or more of lignite, lignocellulosic biomass, plant gum, plant resin, plant tar, plant pitch, or any combination thereof.

Embodiment 44; The method according to embodiment 42 or embodiment 43, wherein the temperature is between 370° C. and 500° C., between 370° C. and 480° C., between 374° C. and 500° C., 380° C. and 500° C., between 380° C. and 450° C., between 400° C. and 480° C., or between 440° C. and 480° C.

Embodiment 45; The method according to any one of embodiments 42 to 44, wherein the wherein the pressure is:
(i) between 20 bar and 400 bar;
(ii) between 40 bar and 300 bar;
(iii) above 200 bar; or
(iv) above 221 bar.

Embodiment 46; The method according to any one of embodiments 42 to 45, wherein the mixture is a slurry or emulsion under continuous flow during said treating.

Embodiment 47; The method according to any one of embodiments 42 to 46, wherein the mixture comprises an additive catalyst selected from the group consisting of; a base catalyst; an acid catalyst; a water-gas-shift catalyst; an alumino-silicate catalyst; a sulphide catalyst; and any combination thereof, wherein the additive catalyst is not derived from: any other component of the mixture or a reactor apparatus component.

Embodiment 48; The method according to embodiment 47, wherein the additive catalyst is selected from the group consisting of sodium hydroxide, potassium hydroxide, sodium carbonate, potassium carbonate, sodium formate, potassium formate, an iron salt, or any combination thereof.

Embodiment 49; The method according to any one of embodiments 42 to 48, wherein the additive catalyst is added to the mixture after the mixture has been heated to more than 300° C., more than 350° C., more than 360° C., more than 370° C., or more than 374° C.

Embodiment 50; The method according to any one of embodiments 42 to 48, wherein the additive catalyst is added to the mixture after the mixture has been pressurised to more than 50 bar, more than 100 bar, more than 150 bar, or more than 200 bar, or more than 221 bar.

Embodiment 51; The method according to any one of embodiments 42 to 50, comprising:
(i) heating and pressuring the aqueous solvent to supercritical temperature and pressure; and
(ii) contacting the polymeric feedstock with the supercritical aqueous solvent to form the mixture.

Embodiment 52; The method according to any one of embodiments 42 to 51, wherein the mixture comprises a solid substrate that is either or both of:
(i) solid or substantially solid at the temperature and the pressure;
(ii) inert or substantially inert at the temperature and the pressure.

Embodiment 53; The method according embodiment 52, wherein the solid substrate is:
(i) a carbonaceous material comprising at least 50%, at least 60%, at least 70%, at least 80%, or at least 90% by weight carbon; or
(ii) is a non-carbonaceous material comprising no more than 10%, no more than 5%, no more than 1%, or no carbon.

Embodiment 54; The method according to embodiment 52 or embodiment 53, wherein the solid substrate is selected from the group consisting of; coals, anthracitic coal, metaanthracite, anthracite semianthracite, bituminous coal, sub-bituminous coal, lignite (i.e. brown coal), coking coal, coal tar, coal tar derivatives, coal char, coke, high temperature coke, foundry coke, low and medium temperature coke, pitch coke, petroleum coke, coke oven coke, coke breeze, gas coke, brown coal coke, semi coke, charcoal, pyrolysis char, hydrothermal char, carbon black, graphite fine particles, amorphous carbon, carbon nanotubes, carbon nanofibers, vapor-grown carbon fibers, fly ash, a mineral, calcium carbonate, calcite, a silicate, silica, quartz, an oxide, a metal oxide, an insoluble or substantially insoluble metal salt, iron ore, a clay mineral, talc, gypsum, carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium.

Embodiment 55; The method according to any one of embodiments 52 to 54, wherein the solid substrate is present in the mixture at a concentration of more than 0.5%, more than 1%, more than 3%, more than 5%, more than 10%, more than 15%, more than 20%, more than 25%, or more than 30% by weight.

Embodiment 56; The method according to any one of embodiments 42 to 55, wherein gases released during said depressurising are used as syngas for production of hydrocarbons.

Embodiment 57; The method according to any one of embodiments 42 to 56, wherein polar and non-polar liquids in the product are separated by distillation followed by physical means.

Embodiment 58; The method according to embodiment 57, wherein the distillation is fractional distillation and the physical means are any one or more of decantation, centrifugation or gravitational means.

Embodiment 59; The method according to any one of embodiments 42 to 58, wherein the mixture comprises at least; 1% wt/wt, 2% wt/wt, 3% wt/wt, 4% wt/wt, 5% wt/wt, 10% wt/wt, 15% wt/wt, 20% wt/wt, 25% wt/wt, 30% wt/wt, 35% wt/wt, 40% wt/wt, 45% wt/wt, 50% wt/wt, 60% wt/wt, 70% wt/wt, 80% wt/wt, 90% wt/wt, 95% wt/wt, or 98% wt/wt, polymeric feedstock.

Embodiment 60; The method according to any one of embodiments 42 to 58, wherein the mixture comprises less than; 98% wt/wt, 95% wt/wt, 90% wt/wt, 80% wt/wt, 70% wt/wt, 60% wt/wt, 50% wt/wt, 45% wt/wt, 40% wt/wt, 35% wt/wt, 30% wt/wt, 25% wt/wt, 20% wt/wt, 15% wt/wt, 10% wt/wt, 5% wt/wt, 4% wt/wt, 3% wt/wt, 2% wt/wt, or 1% wt/wt, polymeric feedstock.

Embodiment 61; The method according to embodiment 59 or embodiment 60, wherein the polymeric feedstock is selected from the group consisting of Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly(vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly(Phenol-formaldehyde) (PF), Epoxies, Polyacetal, (Acetal), Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), polycondensate, Polyetheretherketone (PEEK), Polyetherimide (PEI), Polyethersulfone (PES), Polyethylenechlorinates, (PEC), Polyimide, (PI), Polymethylpentene (PMP), Poly(phenylene Oxide) (PPO), Polyphenylene Sulfide (PPS), Polyphthalamide, (PTA), Polysulfone (PSU), Polyurethane, (PU), Poly(vinylidene chloride) (PVDC), Poly(tetrafluoroethylene) PTFE, Poly(fluoroxy alkane) PFA, Poly(siloxanes), silicones, thermoplastics, thermosetting polymers, natural rubbers, tyre rubbers, ethylene propylene diene monomer rubbers EPDM, chloroprene rubbers, acrylonitrile butadiene (nitrile) rubbers, polyacry late rubbers, Ethylene Acrylic rubbers, Styrene-butadiene rubbers, Polyester urethane rubbers, Polyether urethane rubbers, Fluorosilicone rubbers, silicone rubbers, and copolymers and mixtures of the foregoing.

Embodiment 62; The method according to any one of embodiments 42 to 61, wherein the polymeric feedstock is ground prior to inclusion in the mixture.

Embodiment 63; The method according to any one of embodiments 42 to 62, wherein mixture is emulsified after inclusion of the polymeric feedstock.

Embodiment 64; The method according to any one of embodiments 42 to 63, wherein: the temperature is between about 370° C. and 480° C. and the pressure is between 40 bar and 300 bar;
  the temperature is between about 370° C. and 420° C. and the pressure is between 40 bar and 300 bar;
  the temperature is between about 380° C. and 450° C. and the pressure is between 40 bar and 300 bar;
  the temperature is between about 440° C. and 480° C. and the pressure is between 40 bar and 300 bar; or
  the temperature is between about 400° C. and 460° C. and the pressure is between 40 bar and 300 bar.

Embodiment 65; The method according to any one of embodiments 42 to 64, wherein the temperature is between about 390° C. and 410° C. and the pressure is between 40 bar and 300 bar.

Embodiment 66; The method according to any one of embodiments 42 to 65, wherein the temperature is about 400° C. and the pressure is between 40 bar and 300 bar.

Embodiment 67; The method according to any one of embodiments 42 to 66, wherein the suitable time period is less than about; 60 minutes, 45 minutes, 30 minutes, 25 minutes, 20 minutes, 15 minutes, 10 minutes, 5 minutes or 2 minutes; more than about; 60 minutes, 45 minutes, 30 minutes, 25 minutes, 20 minutes, 15 minutes, 10 minutes or 5 minutes; or between about; 1 minute and 60 minutes, 5 minutes and 45 minutes, 5 minutes and 35 minutes, 10 minutes and 35 minutes, 15 minutes and about 30 minutes, or 20 minutes and 30 minutes.

Embodiment 68; The method according to any one of embodiments 42 to 67, wherein the feedstock does not contain heavy oil or heavy oil residue.

Embodiment 69; The method according to any one of embodiments 1 to 68, wherein the mixture is pressurized and/or heated by an extruder.

Embodiment 70; Upgraded product obtained or obtainable from the method of any one of embodiments 1 to 41 or 69.

Embodiment 71; A product obtained or obtainable from the method of any one of embodiments 42 to 69.

BRIEF DESCRIPTION OF THE FIGURES

A preferred embodiment of the present invention will now be described, by way of an example only, with reference to the accompanying figures wherein:
FIG. 8C shows a boiling range curve from SIMDIS of feedstock and cracked products treated or generated according to a method of the present invention, in this case lubricating oil residue mixed with lignite:
FIG. 9 shows concentrations of Calcium (Ca), Magnesium (Mg), Sodium (Na) and Zinc (Zn) measured by ICP-AES in product samples obtained by a method according to the present invention.

DEFINITIONS

Figure 1:
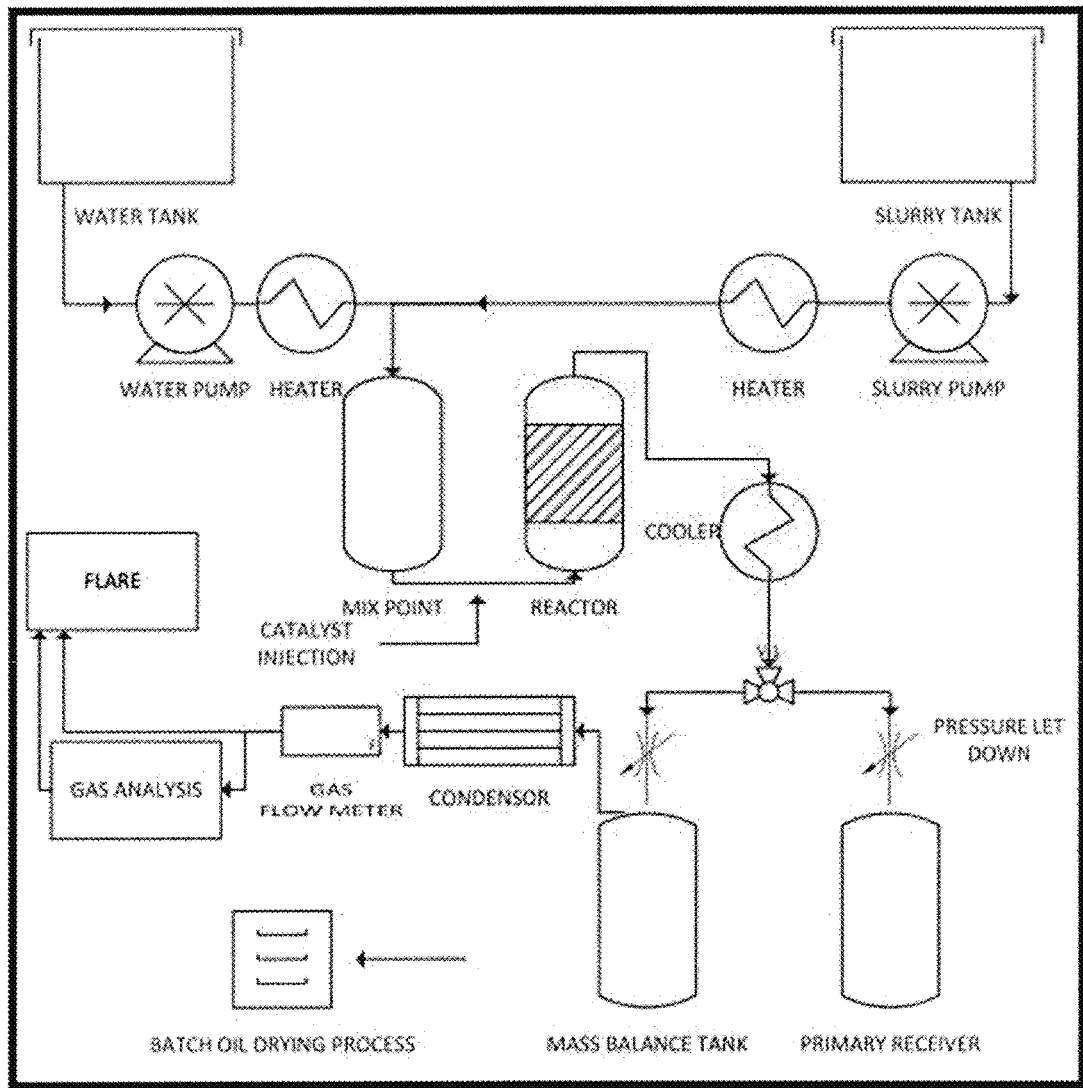
FIG. 1 shows a simplified process flow diagram of a method according to the present invention.

As used in this application, the singular form "a", "an" and "the" include plural references unless the context clearly dictates otherwise. For example, the term "a plant cell" also includes a plurality of plant cells.

As used herein, the term "comprising" means "including." Variations of the word "comprising", such as "comprise" and "comprises," have correspondingly varied meanings. Thus, for example, an aqueous solvent "comprising" water may consist exclusively of water or may include one or more additional components (e.g. alcohol).

As used herein, the term "continuous flow" refers to a process wherein a slurry comprising a feedstock (e.g. and any one or more of; an aqueous solvent, solid substrate, catalyst additive and/or oil additive, is subjected to:
  (a) heating and pressurisation to a target temperature and pressure,
  (b) treatment at target temperature(s) and pressure(s) for a defined time period (a "retention time"), and
  (c) cooling and de-pressurisation;
  during which the slurry is maintained in a stream of continuous movement along the length (or partial length) of a given surface of a reactor vessel. It will be understood that "continuous flow" conditions as contemplated herein are defined by a starting point of heating and pressurisation (i.e. (a) above) and by an end point of cooling and de-pressurisation (i.e. (c) above). Continuous flow conditions as contemplated herein imply no particular limitation regarding flow velocity of the slurry provided that it is maintained in a stream of continuous movement.

As used herein, a "additive catalyst" is a catalyst incorporated into a feedstock slurry and/or reaction mixture that is supplementary to catalytic compounds intrinsically present in feedstock material under treatment in accordance with the methods of the invention, catalytic compounds intrinsically present in any solvent used in accordance with the methods of the invention, catalytic compounds intrinsically present in a solid substrate used to perform the methods of the invention, and/or catalytic compounds intrinsically present in the walls of a reactor apparatus used to perform the methods of the invention.

As used herein, the term "heavy oil" will be understood to encompass those oils with an American Petroleum Institute (API) gravity of less than 25° including, for example, those oils with an API of less than 22.3°, less than 20°, less than 18°, less than 15°, less than 12°, less than 10°, less than 7°, less than 5°, or less than 2°. "Heavy oil" will be understood to include residues obtained from the atmospheric and/or vacuum distillation of oils and petroleum-based products.

As used herein, the term "biofuel" refers to an energy-containing material derived from the processing of organic matter. Non-limiting examples of biofuels include oil products (i.e. bio-oils), char products (otherwise known as upgraded pulverised coal injection (PCI) equivalent products), gaseous products, biodiesel, and alcohols (e.g. ethanol and butanol).

As used herein, the term "bio-oil" will be understood to encompass oil products derived from processing fossilised organic material (e.g. coals such as lignite), non-fossilised organic material (e.g. lignocellulosic matter, polymeric material including plastic), or mixtures thereof.

As used herein, the terms "lubricating oil residue" (LOR), "lube oil residue" (LOR), "used lubricating oil residue" (ULOR), and "used lube oil residue" (ULOR) are used interchangeably and will be understood to have the same meaning.

As used herein, "polymeric" materials will be understood to encompass prepolymers, homopolymers (e.g. prepared from a single monomer species), copolymers (e.g. prepared from at least two monomer species), terpolymers, graft polymers, plastic, elastomeric material, rubber materials, and mixtures thereof.

As used herein, "end of life plastic" or "waste plastic" will be understood to mean plastic material containing at least some proportion of non-plastic contaminant(s) such as, for example, at least; 1%, 5%, 10%, 15%, 20%, 25%, 30%, 35%, 40%, non-plastic material. Non-limiting examples of such contaminants include dirt, paper and wood.

As used herein, "re-refined Vacuum Tower Bottoms" (RVTB) will be understood to mean a non-distillable fraction from the re-refining of used engine oils.

As used herein, "waste engine oil residue" (WEOR) will be understood to have the same meaning as waste engine oil (WEO) residue, and engine oil residue (EOR).

As used herein, "re-refined heavy vacuum distillation oil" (RHVDO) will be understood to have the same meaning as "heavy vacuum distillate bottoms" (RHVDB).

As used herein, "asphalt flux" will be understood to have the same meaning as "asphalt extender", "asphalt blowdown", and "vacuum tower asphalt binder" (VTAB).

As used herein, a "subcritical" substance (e.g. a subcritical solvent) refers to a substance at a temperature and/or pressure below the critical point of the substance. Accordingly, a substance may be "subcritical" at a temperature below its critical point and a pressure above its critical point, at a temperature above its critical point and a pressure below its critical point, or at a temperature and pressure below its critical point.

As used herein, a "solid substrate" is a component that is solid or substantially solid at a reaction temperature and pressure used in accordance with the methods of the present invention. The solid substrate may be capable of sequestering contaminants and/or other organic and/or inorganic matter that de-solubilises from the reaction mixture. Additionally or alternatively, the solid substrate may be capable of altering the flow characteristics of the reaction mixture or the product mixture in a reactor vessel. Solid substrates encompass both carbonaceous and non-carbonaceous materials, non-limiting examples of which include coals, anthracitic coal, meta-anthracite, anthracite semianthracite, bituminous coal, subbituminous coal, lignite (i.e. brown coal), coking coal, coal tar, coal tar derivatives, coal char, coke, high temperature coke, foundry coke, low and medium temperature coke, pitch coke, petroleum coke, coke oven coke, coke breeze, gas coke, brown coal coke, semi coke, charcoal, pyrolysis char, hydrothermal char, carbon black, graphite fine particles, amorphous carbon, carbon nanotubes, carbon nanofibers, vapor-grown carbon fibers, fly ash, a mineral, calcium carbonate, calcite, a silicate, silica, quartz, an oxide, a metal oxide, an insoluble or substantially insoluble metal salt, iron ore, a clay mineral, talc, gypsum, carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium, kaolinite, bentonite, illite, zeolites, calcium phosphate, hydroxyapataite, phyllosilicates, and any combination thereof.

As used herein, the term "aqueous solvent" refers to a solvent comprising at least one percent water based on total weight of solvent. An "aqueous solvent" may therefore comprise between one percent water and one hundred percent water based on total weight of solvent. An "aqueous solvent" will also be understood to include within its scope "aqueous alcohol", "aqueous ethanol", and "aqueous methanol".

As used herein, an "additive catalyst" is a catalyst incorporated into a feedstock slurry and/or reaction mixture that is supplementary to catalytic compounds intrinsically present in heavy oil treated in accordance with the methods of the invention, catalytic compounds intrinsically present in any aqueous solvent used in accordance with the methods of the invention, catalytic compounds intrinsically present in a solid substrate used to perform the methods of the invention, and/or catalytic compounds intrinsically present in the walls of a reactor apparatus used to perform the methods of the invention.

As used herein, the term "intrinsic catalyst" will be understood to be a catalyst that is innately present in a given reaction component such as, for example, any one or more of heavy oil, an aqueous solvent, and/or vessel walls of a reactor apparatus, or, a catalyst that form in situ during the treatment process.

As used herein, the terms "reactor", "reactor apparatus", and "reactor vessel" are used interchangeably and have the same meaning. Each term encompasses any apparatus suitable for performing the methods of the present invention including, for example, continuous flow reactors and batch reactors.

As used herein a "substantially solid" substrate refers to a substrate that is predominantly solid at a specified reaction temperature and/or pressure in that at least 50%, at least 60%, at least 70%, at least 80%, at least 90%, preferably at least 95%, and more preferably at least 98% of the substrate is in a solid form.

As used herein, a "substantially insoluble" substance is one that is predominantly insoluble at a specified reaction temperature and/or pressure in that at least 90%, preferably at least 95%, and more preferably at least 98% of the substrate is not solubilised.

As used herein, an "inert" or "chemically inert" solid substrate is one that does not chemically react with other components in a reaction mixture or catalyse reactions between components in a reaction mixture, at a specified reaction temperature and pressure or at a range of reaction temperatures and pressures.

As used herein, a "substantially inert" or "substantially chemically inert" solid substrate one that does not to any significant degree chemically react with other components in a reaction mixture or catalyse reactions between components in a reaction mixture, at a specified reaction temperature and pressure or at a range of reaction temperatures and pressures. A "substantially inert" or "substantially chemically inert" solid substrate will be understood to react with any other component in a given reaction mixture, or catalyse a reaction between any given components in a reaction mixture, on less than 5%, less than 4%, less than 3%, less than 2%, or less than 1%, of interaction events with the component(s). It will be understood that use of the term "about" herein in reference to a recited numerical value (e.g. a temperature or pressure) includes the recited numerical value and numerical values within plus or minus ten percent of the recited value.

Any description of prior art documents herein, or statements herein derived from or based on those documents, is not an admission that the documents or derived statements are part of the common general knowledge of the relevant art in Australia or elsewhere.

For the purposes of description all documents referred to herein are incorporated by reference unless otherwise stated.

DETAILED DESCRIPTION

Described herein are methods for processing heavy oil feedstocks and heavy oil residue feedstocks into upgraded fuel products. Also described herein are methods for processing polymeric feedstock into products (e.g. biofuel, bio-oil).

The methods require treatment of the feedstock (e.g. heavy oil and/or polymeric material) with an aqueous solvent at a temperature and pressure capable of converting the feedstock into an upgraded product. In general, the temperature and pressure may be marginally under, at, or beyond the supercritical point of the aqueous solvent. In some embodiments, the methods may be advantageously used in upgrading heavy oils that are residues from oil distillation processes. In other embodiments, methods may be advantageously used converting polymeric material (e.g. plastics) into products such as biofuel and bio-oil.

The present invention also provides products generated from treating feedstocks according the methods described herein.

Heavy Oil Feedstocks

The present invention provides methods for the conversion of heavy oil feedstocks into upgraded products (e.g. upgraded petroleum, upgraded oil, upgraded bio-oil etc.).

Suitable feedstocks for use in methods of the present invention will be understood to include suitable heavy oils and also residues obtained from the atmospheric and/or vacuum distillation of oil (e.g. crude oil, bio-oil, used oil, and the like) and products comprising oil.

In some embodiments, the heavy oil can be derived from hydrothermal treatment, chemothermal treatment, and/or pyrolysis of lignocellulosic matter and/or coal (e.g. lignite). For example the heavy oil can be derived from Catalytic Hydrothermal Reactor (Cat-HTR) process such as that described in PCT publication No. WO2011123897 and PCT publication No. WO/2012/092644.

In some embodiments, heavy oils used as feedstock in the methods of the present invention include oils with an American Petroleum Institute (API) gravity of less than 25° including, for example, those oils with an API of less than 22.3°, less than 20°, less than 18°, less than 15°, less than 12°, less than 10°, less than 7°, less than 5°, or less than 2°. "Heavy oil" will be understood to include both petroleum crude oils as well as residues obtained from the atmospheric and/or vacuum distillation of such crudes.

In some embodiments, heavy oils used as feedstock in the methods of the present invention include oils with an API gravity of between 2° and 25°, between 2° and 20°, between 2° and 15°, 2° and 10°, between 5° and 25°, between 5° and 20°, between 5° and 15°, between 5° and 10°, 2° and 5°, between 10° and 25°, between 10° and 20°, between 10° and 15°, between 2° and 22.3°, between 5° and 22.3°, and between 10° and 22.3°.

In other embodiments, heavy oils used as feedstock in the present invention may have an API gravity between 22.3° and 10° and a density between 920 kg/m$^3$ to 1,000 kg/m$^3$, or an API gravity of less than 10° and a density higher than 1,000 kg/m$^3$.

In certain embodiments the heavy oils used as feedstock in the present invention may have a density between 850 kg/m$^3$ to 1,000 kg/m$^3$, or a density between 900 kg/m$^3$ to 1,100 kg/m$^3$, or a density higher than 1000 kg/m$^3$.

In certain embodiments, heavy oils used as feedstock in the present invention may have a viscosity from 100 centipoise (cP) to over 1,000,000 cP. For example, the heavy oils may have a viscosity of more than 100 cP, more than 1000 cP, more than 5000 cP, more than 20000 cP, more than 30000 cP, more than 40000 cP, more than 50000 cP, more than 100000 cP, more than 200000 cP, more than 400000 cP, more than 600000 cP, more than 800000 cP, or more than 1000000 cP, at a temperature of 40° C.

In certain embodiments, heavy oils used as feedstock in the present invention may have an atmospheric equivalent boiling point (AEBP) of than 300° C., more than 350° C., more than 400° C., more than 450° C., more than 500° C., or more than 550° C.

Non-limiting examples of heavy oil that may be used in the methods of the present invention include, crude oil, lubricating oil, shale oil, bitumen, asphalt, tar/oil sand, oil shale, shale oil, synthetic oil, bio-oil, coal-oil, cooking oil, transformer oil, kerogen oil, mineral oil, white mineral oil, aromatic oil, tall oil, plant oils, gas oils, animal oils, and any combination thereof.

In some embodiments, heavy oils used in accordance with the methods described herein may be "used oil". Used oil as contemplated herein is one which had been employed for the specific purpose(s) that it was prepared for. A used oil may be characterised, for example, by containing contaminants such as oxidation products of oil components, depleted additive remnants, combustion products (e.g. water, soot, carbon lead, fuel), abrasives (e.g. dust, wear metals), heavy metals, aromatic hydrocarbons, and so forth. Persons of ordinary skill in the art can readily determine whether a given oil has been used and the degree to which it has been used using standard assessments. Non-limiting examples of used oils that may be used in the methods include used crude oil, used shale oil, used lubricating oil, used peat, used bitumen, used asphalt, tar/oil sand, used oil shale, used shale oil, used synthetic oil, used bio-oil, used coal-oil, used cooking oil, used transformer oil, used kerogen oil, used mineral oil, used white mineral oil, used aromatic oil, used tall oil, used plant oils, used animal oils, and any combination thereof.

In some embodiments, heavy oils for use in the methods of the present invention are residues obtained from the atmospheric and/or vacuum distillation of oils (e.g. crude oils, motor oils, lubricating oils), petroleum, petroleum products, and the like. Non-limiting examples of such residues include vacuum Tower Bottoms (RVTB), waste engine oil residue (WEOR), waste engine oil (WEO) residue, waste oil distillation bottoms (WODB), heavy vacuum distillation oil (RHVDO), asphalt flux, Processed Fuel Oil (PFO) sludges being by-products of the production of Processed Fuel Oil (PFO) from waste oils (PFO is a legally recognised End of Waste fuel oil product produced to the specification set out in the (UK) Environment Agency's PFO Protocol), heavy oil residue of re-refined oil, heavy oil residue from distillation of coal, heavy oil residue from distillation of liquid or tar derived from processing coal, heavy oil and/or tar derived from hydrothermal processing of lignite or sub-bituminous coal or peat, distillation residues of products from hydrothermal processing of lignite or sub-bituminous coal, distillation residues of products from hydrothermal processing of biomass, and any combination thereof.

Heavy oil used in the methods of the present invention may combine with one or more additional components to form a mixture.

Non-limiting examples include lignite, lignocellulosic matter, cellulosic matter, plant gum, plant resin, plant tar, plant pitch, or any combination thereof.

Without being bound by theory, degradation of biomass additive (e.g. lignocellulosic matter) during treatment of the reaction mixture according to the methods of the invention may generate carboxylic acids (e.g. formic acid, acetic acid, propanoic acid). These acids can act as hydrogen donors to metals present in the heavy oil (e.g. transition metals) which can in turn catalyse transfer of hydrogen from the acids to the heavy oil where it may stabilise cracked hydrocarbon chains.

Pre-treatment may be used to break down the physical and/or chemical structure of the additional component(s) increasing accessibility to various reagents utilised in the methods of the invention (e.g. heavy oil, oil-based solvent, catalysts and the like) and/or other reaction parameters (e.g. heat and pressure).

The proportion of the additional component(s) in a mixture may constitute at least 0.05% wt/wt, at least 0.5% wt/wt, at least 1.0% wt/wt, at least 2% wt/wt, at least 5% wt/wt, at least 10% wt/wt, at least 15% wt/wt, at least 20% wt/wt, at least 25% wt/wt, at least 30% wt/wt, at least 40% wt/wt, or at least 50% wt/wt, in the mixture. The proportion of the additional component(s) in a mixture may constitute less than 0.5% wt/wt, less than 0.5% wt/wt, less than 1.0% wt/wt, less than 2% wt/wt, less than 5% wt/wt, less than 10% wt/wt, less than 15% wt/wt, less than 20% wt/wt, less than 25% wt/wtt, less than 30% wt/wt, less than 40% wt/wt, or less than 50% wt/wt, of the mixture.

Slurry Components

Feedstocks (e.g. heavy oil, heavy oil residues, polymeric materials including plastic, and any combination thereof) utilised in accordance with the methods of the present invention is preferably treated at target temperature and pressure in the form of a slurry. The slurry may be in continuous movement (i.e. "continuous flow") while being treated.

During treatment at a target temperature and pressure according to the methods described herein, the slurry will generally comprise heavy oil feedstock in combination with an aqueous solvent (e.g. an aqueous solvent, an aqueous alcohol solvent, an aqueous ethanol solvent, an aqueous methanol solvent) optionally in combination with a solid substrate, a catalyst additive, and/or an oil additive. Any solid component(s) to be included in the slurry may be pretreated for example, by generating a particulate form matter (e.g. by physical methods) and mixing with the solvent.

No particular limitation exists regarding the relative proportions of heavy oil, aqueous solvent, catalysts, and/or solid substrate in the slurry. Non-limiting examples of potential quantities of these various components are described in the sections below.

Heavy Oil Component

A slurry and/or reaction mixture in accordance with the methods of the present invention may comprise heavy oil. Non-limiting examples of suitable heavy oils are provided in the section above entitled "Heavy Oil Feedstocks".

In certain embodiments of the invention, the heavy oil may constitute at least 5% wt/wt, at least 10% wt/wt, at least 15% wt/wt, at least 20% wt/wt, at least 25% wt/wt, at least 30% wt/wt, at least 40% wt/wt, at least 50% wt/wt, at least 60% wt/wt, at least 70% wt/wt, at least 80% wt/wt, at least 90% wt/wt, at least 95% wt/wt, at least 96% wt/wt, at least 97% wt/wt, at least 98% wt/wt, or at least 99% wt/wt, of the slurry.

Aqueous Solvent Component

A slurry and/or reaction mixture for use in accordance with the methods of the present invention comprises an aqueous solvent.

In some embodiments the aqueous solvent is water.

In certain embodiments of the invention, the water may constitute more than 5% wt/wt more than 10% wt/wt, more than 20% wt/wt, more than 30% wt/wt, more than 40% wt/wt, more than 50% wt/wt, more than 60% wt/wt, more than 70% wt/wt, more than 80% wt/wt, more than 90% wt/wt, or more than 95% wt/wt, of the slurry. The water may constitute less than 10% wt/wt, less than 20% wt/wt, less than 30% wt/wt, less than 40% wt/wt, less than 50% wt/wt, less than 60% wt/wt, less than 70% wt/wt, less than 80% wt/wt, less than 90% wt/wt, or less than 95% wt/wt, of the slurry.

In some embodiments, the water may be recycled from the product of the process. For example, a portion water present following completion of the reaction may be taken off as a side stream and recycled into the slurry.

The solvent may comprise or consist of one or more aqueous alcohol/s. Non-limiting examples of suitable alcohols include methanol, ethanol, isopropyl alcohol, isobutyl alcohol, pentyl alcohol, hexanol, iso-hexanol, and any combination thereof.

Solid Substrate Component

A slurry and/or reaction mixture for use in accordance with the methods of the present invention may comprise a solid substrate component as described herein.

Favourable characteristics of the solid substrate may include any one or more of the following; it remains inert or substantially inert at the reaction temperature and pressure used; it remains unaltered or substantially unaltered upon completion of the process; it remains as a solid or substantially solid at the reaction temperatures and pressures used; it is of low or moderate hardness so that it does not induce substantial abrasion or erosive corrosion in reactors (e.g. continuous flow reactors); it has a high internal or external specific surface area so that it can adsorb and/or absorb large quantities of bio-products and/or other precipitates during the conversion process.

The solid substrate may be a carbonaceous material. By way of non-limiting example only, the solid substrate may be a carbonaceous material comprising at least 50%, at least 60%, at least 70%, at least 80%, at least 90%, or at least 95% by weight carbon.

Without being bound by theory, carbonaceous solid substrates (e.g. lignite) may act as a substrate for heavy metals present in the heavy oils, adsorbing them to thereby lower heavy metal content in the upgraded product. Without being bound by theory the solid substrates may act as active surfaces to adsorb materials precipitating during reactions and thereby reduce the tendency of pressure differentials to develop across continuous flow reactors. Without being bound by theory the solid substrates may favourably alter the flow characteristics of oils and slurries being pumped through reactors under conditions of continuous flow.

Non-limiting examples of suitable carbonaceous materials for use as the solid substrate include coals (e.g. anthracitic coals such as meta-anthracite, anthracite and semianthracite; bituminous coals, subbituminous coals, lignite (i.e. brown coal), coking coal, coal tar, coal tar derivatives, coal char); cokes (e.g. high temperature coke, foundry coke, low and medium temperature coke, pitch coke, petroleum coke, coke oven coke, coke breeze, gas coke, brown coal coke, semi coke); charcoal; pyrolysis char; hydrothermal char; carbon black; graphite fine particles; amorphous carbon; carbon nanotubes; carbon nanofibers; vapor-grown carbon fibers; and any combination thereof.

In some preferred embodiments of the present invention the solid substrate may be a carbon rich char.

The solid substrate may be a non-carbonaceous material. By way of non-limiting example only, the solid substrate may be a non-carbonaceous material comprising less than 20%, less than 10%, less than 5%, less than 3%, less than 2%, or less than 1%, by weight carbon, or comprise no carbon.

Non-limiting examples of suitable non-carbonaceous materials for use as the solid substrate include ash (e.g. fly ash); minerals (e.g. calcium carbonate, calcite, silicates, silica, quartz, oxides including iron ore, clay minerals, talc, gypsum); an insoluble or substantially insoluble metal salt; and any combination thereof.

Further non-limiting examples of suitable materials for use as the solid substrate include carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium, kaolinite, bentonite, illite, zeolites, calcium phosphate, hydroxyapataite, phyllosilicates, and any combination thereof.

In certain embodiments of the present invention, the solid substrate may constitute less than 20% wt/wt, less than 15% wt/wt, less than 10% wt/wt, less than 5% wt/wt, or less than 2% wt/wt of the slurry.

In certain embodiments of the present invention, the solid substrate may constitute more than 0.5% wt/wt, more than 1% wt/wt, more than 3% wt/wt, more than 5% wt/wt, more than 10% wt/wt, more than 15% wt/wt, more than 20% wt/wt, more than 25% wt/wt, or more than 30% wt/wt of the slurry.

The optimal particle size and optimal concentration of the solid substrate may depend upon factors such as, for example, the heat transfer capacity of the heavy oil utilised (i.e. the rate at which heat can be transferred into and through individual particles), the desired rheological properties of the slurry and/or the compatibility of the slurry with component/s of a given apparatus within which the methods of the invention may be performed (e.g. reactor tubing). The optimal particle size and/or concentration of the solid substrate component in a slurry used for the methods of the invention can readily be determined by a person skilled in the art using standard techniques. For example, a series of slurries may be generated, each sample in the series comprising a specific solid substrate of different size and/or different concentration to those of other samples. Each slurry can then be treated in accordance with the methods of the invention under a conserved set of reaction conditions. The optimal solid substrate size and/or concentration can then be determined upon analysis and comparison of the products generated from each slurry using standard techniques in the art.

In certain embodiments of the invention, the size of a solid substrate component in the slurry may be between about 10 microns and about 10,000 microns. For example, the size may be more than about 50, 100, 500, 750, 1000, 2000, 3000, 4000, 5000, 6000, 7000, 8000 or 9000 microns. Alternatively, the size may less than about 50, 100, 500, 750, 1000, 2000, 3000, 4000, 5000, 6000, 7000, 8000 or 9000 microns. In some embodiments of the invention, the particle size distributions and particle surface charge characteristics of the solid substrate component of the slurry may be optimized in order to provide desirable slurry characteristics when mixed, for example, to obtain minimum viscosity for a given solids content. The optimal particle size and/or particle surface charge of solid components in a given slurry used can readily be determined by a person skilled in the art using standard techniques. For example, a series of slurries may be generated, each sample in the series comprising different concentrations of solid components compared to the other samples.

Each slurry can then be treated in accordance with the methods of the invention under a conserved set of reaction conditions. The optimal particle size and/or particle surface charge of solid substrate component can then be determined upon analysis and comparison of the products generated from each slurry using standard techniques known in the art.

Polymeric Components

A slurry for use in accordance with the methods of the present invention may comprise polymeric material.

For example, prepolymers, oligomers, homopolymers, copolymers, terpolymers, graft polymers, plastic, end of life plastic, waste plastic, elastomeric material, rubber materials, and mixtures may be used in combination with heavy oil components of the feedstock mixture for cracking in the reactor. Accordingly, these and other polymeric material/s may be added to the feedstock mixture for cracking in the reactor according to the methods described below.

The slurry may comprise a mixture of heavy oil and/or heavy oil residue in combination with the polymeric material (e.g. plastic), optionally in combination with a solid substrate according to the present invention (e.g. lignite).

The polymeric materials may be characterised in part by their glass transition temperatures $T_g$ and/or their melting temperatures Tm in the case of semi-crystalline or crystalline polymers. Above $T_g$ polymers generally exhibit rubbery characteristics. Non-limiting examples of glass transition temperatures and melting temperatures are given below in Table 1.

TABLE 1

$T_g$ and $T_m$ temperatures of exemplary polymers

| Polymer | $T_m$ ° C. | $T_g$ ° C. |
|---|---|---|
| Polyethylene (PE) | 135 | −68 |
| Polypropylene (PP) | 176 | −8 |
| Polystyrene (PS) | 240 | 100 |
| Poly(methyl methacrylate) PMMA | 200 | 105 |
| Poly(vinyl chloride) PVC | 180 | 82 |
| Poly(vinylidene fluoride) (PVDF) | 210 | −39 |
| Polyisoprene | 28 | −70 |
| Nylon-6,6 | 265 | 50 |

Source; Williams (1971) cited in. "Introduction to Polymer Science and Chemistry; A Problem-Solving Approach" Second Edition, Manas Chanda, CRC Press. 11 Jan. 2013.

Although not necessarily required, prior to mixing with the heavy oil and/or heavy oil residues the polymeric material may be pretreated to break down physical and/or chemical structure. Pre-treatment of the organic matter may comprise physical methods, non-limiting examples of which include grinding, chipping, shredding, milling (e.g. vibratory ball milling), compression/expansion, agitation, and/or pulse-electric field (PEF) treatment.

Additionally or alternatively, pre-treatment of the polymeric material may comprise physio-chemical methods, non-limiting examples of which include pyrolysis, steam explosion, ammonia fiber explosion (AFEX), ammonia recycle percolation (ARP), and/or carbon-dioxide explosion. For example, steam explosion involves exposing the organic matter to high pressure steam in a contained environment before the resulting product is explosively discharged to an atmospheric pressure. Pre-treatment with steam explosion may additionally involve agitation of the organic matter.

Additionally or alternatively, pre-treatment of the polymeric material may comprise chemical methods, non-limiting examples of which include ozonolysis, acid hydrolysis (e.g. dilute acid hydrolysis using $H_2SO_4$ and/or HCl), alkaline hydrolysis (e.g. dilute alkaline hydrolysis using sodium, potassium, calcium and/or ammonium hydroxides), oxidative delignification (i.e. lignin biodegradation catalysed by the peroxidase enzyme in the presence of $H_2O_2$), and/or the organosolvation method (i.e. use of an organic solvent mixture with inorganic acid catalysts such as $H_2SO_4$ and/or HCl to break lignin-hemicellulose bonds).

Non limiting examples of polymeric materials that can be treated in combination with heavy oil and/or heavy oil residues according to the methods of the present invention include Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly(vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly (Phenol-formaldehyde) (PF), Epoxies, Polyacetal, (Acetal). Polyacrylates (Acrylic), Polyacrylonitrile (PAN), Polyamide-imide (PAI), Polyaryletherketone (PAEK), Polybutadiene (PBD), Polybutylene (PB). Polycarbonate (PC), Polydicyclopentadiene (PDCP), Polyketone (PK), polycondensate, Polyetheretherketone (PEEK), Polyetherimide (PEI), Polyethersulfone (PES), Polyethylenechlorinates. (PEC), Polyimide, (PI), Polymethylpentene (PMP), Poly (phenylene Oxide) (PPO), Polyphenylene Sulfide (PPS), Polyphthalamide, (PTA), Polysulfone (PSU), Polyurethane, (PU), Poly(vinylidene chloride) (PVDC). Poly(tetrafluoroethylene) PTFE, Poly(fluoroxy alkane) PFA, Poly(siloxanes), silicones, thermosplastics, thermosetting polymers, natural rubbers, tyre rubbers, ethylene propylene diene monomer rubbers EPDM, chloroprene rubbers, acrylonitrile butadiene (nitrile) rubbers, polyacrylate rubbers. Ethylene Acrylic rubbers, Styrene-butadiene rubbers, Polyester urethane rubbers, Polyether urethane rubbers, Fluorosilicone rubbers, silicone rubbers, and copolymers and mixtures thereof.

Without limitation, the polymeric material may comprise a low content of elements other than carbon, hydrogen and oxygen. For example, the polymeric material may contain less than about 5% w/w nitrogen, less than about 1% w/w nitrogen, less than about 0.5% w/w nitrogen, or less than about 0.1% w/w nitrogen.

Additionally or alternatively, the polymeric material may comprise less than about 1% w/w total halogens, less than about 1% w/w total halogens, less than about 0.5% w/w total halogens, less than about 0.1% w/w total halogens, or less than about 0.05% total halogens.

Additionally or alternatively, the polymeric material may comprise a molar ratio of hydrogen to carbon (H/C) that is as high. For example, the H/C molar ratio may be greater than 2.15, greater than 2.0, greater than 1.8, greater than 1.6, greater than 14, greater than 1.2, greater than 1.0, or greater than 0.8.

In some embodiments, the polymeric material may be in the form of mixed or sorted waste plastics and in some cases may be contaminated with organic and inorganic impurities. The waste plastic material may require some pre-processing before being processed according to the methods of the present invention. For example, the waste plastic may require sieving or screening to remove abrasive particles.

Without limiting the mode of action polymers treated according to the methods of the present invention may be cracked to liquids having lower boiling and melting points or they may directly or indirectly act as sources of hydrogen which is then incorporated into the product liquids.

By way of non-limiting example, a slurry and/or reaction mixture used in the methods of the present invention may comprise heavy oil in combination with polymeric material/s. In alternative embodiments, a slurry and/or reaction mixture used in the methods of the present invention may comprise polymeric material/s and may not comprise heavy oil.

In either case, the slurry and/or reaction mixture may comprise at least; 1% wt/wt, 2% wt/wt, 3% wt/wt, 4% wt/wt, 5% wt/wt, 10% wt/wt, 15% wt/wt, 20% wt/wt, 25% wt/wt, 30% wt/wt, 35% wt/wt, 40% wt/wt, 45% wt/wt, 50% wt/wt, 60% wt/wt, 70% wt/wt, 80% wt/wt, 90% wt/wt, 95% wt/wt, or 98% wt/wt, polymeric material.

In either case, the slurry and/or reaction mixture may comprise less than; 98% wt/wt, 95% wt/wt, 90% wt/wt, 80% wt/wt, 70% wt/wt, 60% wt/wt, 50% wt/wt, 45% wt/wt, 40% wt/wt, 35% wt/wt, 30% wt/wt, 25% wt/wt, 20% wt/wt, 15% wt/wt, 10% wt/wt, 5% wt/wt, 4% wt/wt, 3% wt/wt, 2% wt/wt, or 1% wt/wt, polymeric material.

Catalysts

The upgrading of heavy oils using the methods of the present invention may be enhanced by the use of one or more catalyst additives. Although some catalysts may be an intrinsic component of the heavy oils, aqueous solvent (e.g. hydronium/hydroxide ions of water, compound/s in the oil), solid substrate, and/or vessel walls of a reactor apparatus in which the heavy oil may be treated (e.g. transition/noble metals), the invention contemplates the use of additive catalyst(s) to enhance the generation of upgraded products from heavy oil. By additive catalyst it will be understood that the catalyst is supplementary to catalytic compounds intrinsically present in the feedstock (e.g. heavy oil), aqueous solvent, solid substrate, and/or walls of a reactor apparatus in which the method is performed. For example, used oil and/or heavy oil residue within a slurry treated according to the methods may have contaminants that can be considered intrinsic catalysts.

Although the use of additive catalysts may be advantageous in certain circumstances, the skilled addressee will recognise that the methods of the invention may be performed without using them.

An additive catalyst as contemplated herein may be any catalyst that enhances the upgrading of heavy oil using the methods of the invention, non-limiting examples of which include base catalysts, acid catalysts, alkali metal hydroxide catalysts, transition metal hydroxide catalysts, alkali metal formate catalysts, transition metal formate catalysts, reactive carboxylic acid catalysts, transition metal catalysts, sulphide catalysts, noble metal catalysts, water-gas-shift catalysts, and combinations thereof. Suitable catalysts are described, for example, in United States of America patent publication number 2012-0311658 A1 entitled "Methods for biofuel production", the entire contents of which are incorporated herein by reference.

Table 2 below provides a summary of various exemplary catalysts that may be employed in the methods of the invention and the corresponding reactions that they may catalyse.

TABLE 2 summary catalysts and corresponding reactions

| Reaction Type | Catalyst Family | Catalyst Family Member | Specific example(s) | Preferred catalysts/ comments |
|---|---|---|---|---|
| Hydrolysis | Base catalysts | Sub/super-critical water | Hydroxide ion in sub/super-critical water | |
| | | All alkali and transition metal salts, both cations and anions can contribute. Include all common inorganic anions | M = any alkali or transition metal | M = Na, K, Fe, Ca, Ba |
| | | | A = anions, including: aluminate, sulfate, sulfite, sulfide phosphate, phosphite nitrate, nitrite silicate hydroxide alkoxide carbonate oxide | A = aluminate, phosphate, silicate, hydroxide, methoxide, ethoxide carbonate sulphate sulphide disulphide (FeS$_2$) oxide |
| | | Any organic base | ammonia, pyridine, etc. | |
| Hydrolysis | Acid catalysts (slower) | Sub/super-critical water | Hydronium ion in sub/super-critical water | |
| | | Any liquid mineral or organic acid | HA, where A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals |
| Dehydration (elimination) | Acid catalysts | Sub/super-critical water | Hydronium ion in sub/super-critical water | |
| | | Any liquid mineral or organic acid | HA, where A = anions, including: aluminate, sulfate, sulfite, sulfide phosphate, phosphite nitrate, nitrite silicate hydroxide alkoxide | Acids may form from the in-situ formation of carboxylic acids, phenolics and the presence of minerals. zeolites or alumino-silicates in general may be added |

TABLE 2-continued summary catalysts and corresponding reactions

| Reaction Type | Catalyst Family | Catalyst Family Member | Specific example(s) | Preferred catalysts/ comments |
|---|---|---|---|---|
| Transfer Hydrogenation or in-situ $H_2$ generation | Transfer hydrogenation catalysts | All alkali and transition metal hydroxides and formates | carbonate carboxy group M = any alkali or transition metal | M = Na, K |
| | | All reactive carboxylic acids | A = hydroxide, formate | A = hydroxide, formate formic, acetic |
| | | All transition and noble metals | All transition and noble metals | M = Fe, Pd, Pd, Ni Ru Rh |
| Decarboxylation | Largely thermal | Acid and transition (noble) metal cats have been reported to aid the process | All transition and noble metals supported on solid acids | $Pt/Al_2O_3/SiO_2$ $Pd/Al_2O_3/SiO_2$ $Ni/Al_2O_3/SiO_2$ |
| Decarbonylation | Largely thermal | As for decarboxylation | As for decarboxylation | As for decarboxylation |
| In-situ gasification | Largely thermal | Transition metals | supported transition metals sulfides | $Pt/Al_2O_3/SiO_2$ $Pd/Al_2O_3/SiO_2$ $Ni/Al_2O_3/SiO_2$ Fe $Fe_xS_y$ $FeS/Al_2O_3$ $FeS/SiO_2$ $FeS/Al_2O_3/SiO_2$ |
| Water-Gas Shift | WGS catalysts | Standard WGS catalysts | As per literature | As per literature |
| Direct Hydrogenation with $H_2$ | Transition metals | Zero valent metals Sulfides | | Fe, Pt, P, Ni as zero valent FeS, $Fe_xS_y$ |
| Hydrode-oxygenation | Combined acid and hydrogenation catalyst | Transition metal and solid acid | M = transition metal A = acidic solid | $Pt/Al_2O_3/SiO_2$ $Pd/Al_2O_3/SiO_2$ $Ni/Al_2O_3/SiO_2$ $NiO/MoO_3$ $CoO/MoO_3$ $NiO/WO_2$ zeolites loaded with noble metals, e.g. ZSM-5, Beta, ITQ-2 |

The optimal quantity of an additive catalyst used in the methods of the invention may depend on a variety of different factors including, for example, the type of heavy oil being upgraded, the volume of heavy oil under treatment, the aqueous solvent utilised, the specific temperature and pressure employed during the reaction, the type of catalyst and the desired properties of the upgraded product. By following the methods of the invention, the optimal quantity of an additive catalyst to be used can be determined by one skilled in the art without inventive effort.

In certain embodiments, an additive catalyst or combination of additive catalysts may be used in an amount of between about 0.1% and about 10% w/v catalysts, between about 0.1% and about 7.5% w/v catalysts, between about 0.1% and about 5% w/v catalysts, between about 0.1% and about 2.5% w/v catalysts, between about 0.1% and about 1% w/v catalysts, or between about 0.1% and about 0.5% w/v catalysts (in relation to the solvent).

It will be understood that no particular limitation exists regarding the timing at which the additive catalyst(s) may be applied to a slurry comprising heavy oil and an aqueous solvent when performing the methods of the invention. For example, the additive catalyst(s) may be added during the preparation of the slurry or to the slurry before heating/pressurisation to target reaction temperature and pressure. Alternatively, the additive catalyst(s) may be added during heating/pressurisation to target reaction temperature and pressure, and/or after reaction temperature and pressure are reached.

Additive catalyst(s) may be included in a reaction mixture comprising heavy oil and aqueous solvent used for treatment according to the present invention prior to heating and/or pressurising the reaction mixture, during heating and/or pressurising of the reaction mixture, and/or after the reaction mixture reaches a desired reaction temperature and/or reaction pressure.

Reaction Conditions

In accordance with the methods of the present invention, heavy oil feedstock may be treated with an aqueous solvent optionally in the presence of; a solid substrate as described herein, and/or an additive catalyst as described herein; under conditions of increased temperature and pressure to produce an upgraded product.

The specific conditions of temperature and pressure used when practicing the methods of the invention may depend on a number different factors including, for example, the type of aqueous solvent used, the type of heavy oil under treatment, the relative proportions of components in the reaction mixture (e.g. the proportion of aqueous solvent, heavy oil, additive catalyst(s), solid substrate and/or any other additional component/s), the types of additive catalyst(s) utilised (if present), the retention time, and/or the type of apparatus in which the methods are performed. These and other factors may be varied in order to optimise a given set of conditions so as to maximise the yield of upgraded product and/or reduce the processing time.

Desired reaction conditions may be achieved, for example, by conducting the reaction in a suitable apparatus (e.g. a sub/supercritical reactor apparatus) capable of maintaining increased temperature and increased pressure.

Temperature and Pressure

According to the methods of the present invention a reaction mixture comprising heavy oil and an aqueous solvent is provided and treated at a target temperature and pressure for a fixed time period ("retention time") to provide an upgraded product.

The optimal reaction temperature and/or pressure for a given heavy oil feedstock may be readily determined by the skilled addressee by preparing and running a series of reactions that differ only by temperature and/or pressure utilised and analysing the yield and/or quality of the upgraded product.

It will be understood that in certain embodiments an aqueous solvent used in the methods of the present invention may be heated and pressurised beyond its critical temperature and/or beyond its critical pressure (i.e. beyond the 'critical point' of the solvent). Accordingly, the solvent may be a "supercritical" aqueous solvent if heated and pressurised beyond the 'critical point' of the aqueous solvent.

In one embodiment an aqueous solvent (e.g. water) in a mixture with heavy oil treated by the methods of the present invention may be heated and pressurised to level(s) above its critical temperature and pressure (i.e. above the 'critical point' of the aqueous solvent). Accordingly, the mixture may comprise a 'supercritical' aqueous solvent when performing the methods.

In certain embodiments an aqueous solvent (e.g. water) in a mixture with heavy oil treated by the methods of the present invention may be heated and pressurised to level(s) below its critical temperature and pressure (i.e. below the 'critical point' of the aqueous solvent). Accordingly, the mixture may comprise a 'subcritical' aqueous solvent when performing the methods. Preferably, the 'subcritical' solvent is heated and/or pressurised to level(s) approaching the 'critical point' of the solvent (e.g. between about 10° C. to about 50° C. below the critical temperature and/or between about 10 bar to about 50 bar below its critical pressure).

In some embodiments, an aqueous solvent (e.g. water) in a mixture with heavy oil treated by the methods of the present invention may be heated and pressurised to levels both above and below its critical temperature and pressure (i.e. heated and/or pressurised both above and below the 'critical point' of the solvent at different times). Accordingly, the aqueous solvent of the mixture may oscillate between 'subcritical' and 'supercritical' states when performing the methods.

In certain embodiments, treatment of a mixture comprising heavy oil and an aqueous solvent using the methods of the invention may be conducted at; temperature(s) of above 370° C. and pressure(s) of above 20 bar; temperature(s) of above 370° C. and pressure(s) above 40 bar; temperature(s) of above 370° C. and pressure(s) of above 60 bar; temperature(s) of above 370° C. and pressure(s) of above 80 bar; temperature(s) of above 370° C. and pressure(s) of above 100 bar; temperature(s) of above 370° C. and pressure(s) of above 120 bar; temperature(s) of above 370° C. and pressure(s) of above 140 bar; temperature(s) of above 370° C. and pressure(s) of above 160 bar; temperature(s) of above 370° C. and pressure(s) of above 180 bar; temperature(s) of above 370° C. and pressure(s) of above 200 bar; temperature(s) of above 370° C. and pressure(s) of above 220 bar; temperature(s) of above 370° C. and pressure(s) of above 240 bar; temperature(s) of above 370° C. and pressure(s) of above 260 bar; temperature(s) of above 370° C. and pressure(s) of above 280 bar; temperature(s) of above 370° C. and pressure(s) of above 300 bar; temperature(s) of above 370° C. and pressure(s) of above 350 bar; temperature(s) of above 400° C. and pressure(s) of above 20 bar; temperature(s) of above 400° C. and pressure(s) above 40 bar; temperature(s) of above 400° C. and pressure(s) of above 60 bar; temperature(s) of above 400° C. and pressure(s) of above 80 bar; temperature(s) of above 400° C. and pressure (s) of above 100 bar; temperature(s) of above 400° C. and pressure(s) of above 120 bar; temperature(s) of above 400° C. and pressure(s) of above 140 bar; temperature(s) of above 400° C. and pressure(s) of above 160 bar; temperature(s) of above 400° C. and pressure(s) of above 180 bar; temperature(s) of above 400° C. and pressure(s) of above 200 bar; temperature(s) of above 400° C. and pressure(s) of above 220 bar; temperature(s) of above 400° C. and pressure(s) of above 240 bar; temperature(s) of above 400° C. and pressure(s) of above 260 bar; temperature(s) of above 400° C. and pressure(s) of above 280 bar; temperature(s) of above 400° C. and pressure(s) of above 300 bar; temperature(s) of above 400° C. and pressure(s) of above 350 bar temperature(s) of above 374° C. and pressure(s) of above 221 bar; temperature(s) of above 375° C. and pressure(s) of above 225 bar; temperature(s) of between 370° C. and 550° C. and pressure(s) of between 20 bar and 400 bar; temperature(s) of between 374° C. and 500° C. and pressure(s) of between 221 bar and 400 bar; temperature(s) of between 374° C. and 550° C. and pressure(s) of between 221 bar and 400 bar; temperature(s) of between 375° C. and 550° C. and pressure(s) of between 221 bar and 400 bar; temperature(s) of between 375° C. and 550° C. and pressure(s) of between 225 bar and 400 bar.

In certain embodiments treatment of a mixture comprising heavy oil and an aqueous solvent using the methods of the invention may be conducted at; temperatures of between 380° C. and 450° C. and pressures of between 40 and 300 bar.

In certain embodiments, the temperature may be between 370° C. and 500° C., between 370° C. and 480° C., between 374° C. and 500° C., 380° C. and 500° C., between 380° C. and 450° C., between 400° C. and 480° C., or between 440° C. and 480° C.; and the pressure may be more than 20 bar.

Retention Time

The specific time period over which a slurry of the present invention comprising feedstock (e.g. heavy oil, heavy oil residues, polymeric materials including plastic, and any combination thereof) and an aqueous solvent may be treated at a target temperature and pressure (i.e. the "retention time") to provide an upgraded product may depend on a number different factors including, for example, the type of heavy oil under treatment and the relative proportions or types of components in the reaction mixture (e.g. the proportion of aqueous solvent, additive catalyst(s), solid substrates and/or any other additional component/s), and/or the type of apparatus in which the methods are performed. These and other factors may be varied in order to optimise a given method so as to maximise the yield and/or reduce the processing time. Preferably, the retention time is sufficient to upgrade all or substantially all of the heavy oil used as a feedstock into an upgraded product.

In certain embodiments, the retention time is less than about 60 minutes, 45 minutes, minutes, 25 minutes, 20 minutes, 15 minutes, 10 minutes or less than about 5 minutes. In certain embodiments, the retention time is more than about 60 minutes, 45 minutes, 30 minutes, 25 minutes, 20 minutes, 15 minutes, 10 minutes or more than about 5 minutes. In other embodiments, the retention time is between about 1 minute and about 60 minutes. In 30 additional embodiments, the retention time is between about 5 minutes and about 45 minutes, between about 5 minutes and about 35 minutes, between about 10 minutes and about 35 minutes, or between about 15 minutes and about 30 minutes. In further embodiments, the retention time is between about 20 minutes and about 30 minutes.

The optimal retention time for a given set of reaction conditions as described herein may be readily determined by the skilled addressee by preparing and running a series of reactions that differ only by the retention time, and analysing the yield and/or quality of upgraded product generated.

Heating Cooling, Pressurisation De-Pressurisation

A reaction mixture (e.g. in the form of a slurry) comprising feedstock (e.g. heavy oil, heavy oil residues, polymeric materials including plastic, and any combination thereof) and an aqueous solvent, and optionally additive catalyst(s), solid substrates and/or any other additional component/s may be brought to a target temperature and pressure (i.e. the temperature/pressure maintained for the "retention time") over a given time period.

In some embodiments, the reaction mix undergoes a separate pre-heating stage prior to reaching reaction temperature. The pre-heating stage may be performed on a feedstock slurry prior to the full reaction mix being formed. Alternatively the pre-heating stage may be performed on a slurry comprising all components of the reaction mixture. In some embodiments, the pre-heating stage raises the temperature of the feedstock slurry or reaction mixture to a maximum temperature of about; 120° C., 130° C., 140° C., 150° C., 160° C., 170° C., 180° C., 190° C., 200° C., 220° C., 240° C., 260° C., 280° C., 300° C., 320° C., 340° C. or 360° C. In other embodiments, the temperature is raised to less than about; 120° C., 130° C., 140° C., 150° C., 160° C., 170° C., 180° C., 190° C., 200° C., 220° C., 240° C., 260° C., 280° C., 300° C., 320° C., 340° C. or 360° C. In still other embodiments the temperature is raised to between about 100° C. and about 200° C., between about 200° C. and about 300° C., between about 300° C. and about 360° C., between about 120° C. and about 180° C., or between about 120° C. and about 160° C.

In continuous flow systems, pressure will generally change from atmospheric to target pressure during the time it takes to cross the pump (i.e. close to instantaneous) whereas in a batch system it will mirror the time that it takes to heat the mixture up.

In some embodiments, the reaction mixture may be brought to a target temperature and/or pressure in a time period of between about 30 seconds and about 30 minutes.

In some embodiments, the reaction mixture may be brought to a target temperature and/or pressure in a time period less than about 15 minutes, less than about 10 minutes, less than about 5 minutes, or less than about 2 minutes.

In certain embodiments, the reaction mixture may be brought to a target pressure substantially instantaneously and brought to a target temperature in less than about 20 minutes, less than about 10 minutes, or less than about 5 minutes. In other embodiments, the reaction mixture may be brought to a target pressure substantially instantaneously and brought to a target temperature in less than about two minutes. In other embodiments, the reaction mixture may be brought to a target pressure substantially instantaneously and brought to a target temperature in between about 1 and about 2 minutes.

Additionally or alternatively, following completion of the retention time period the product mixture generated may be cooled to between about 150° C. and about 200° C., between about 160° C. and about 200° C., preferably between about 170° C. and about 190° C. and more preferably about 180° C., in a time period of less than about 10 minutes, preferably less than about 7 minutes, more preferably less than about 6 minutes, preferably between about 4 and about 6 minutes, and more preferably about 5 minutes. Following the initial cooling period, the temperature may further reduced to ambient temperature with concurrent de-pressurisation by fast release into a cool aqueous medium (e.g. cooled water).

The processes of heating/pressurisation and cooling/de-pressurisation may be facilitated by performing the methods of the present invention in a continuous flow system (see section below entitled "Continuous flow").

Continuous Flow

Methods of the present invention may be under conditions of continuous flow.

Although the methods need not be performed under conditions of continuous flow, doing so may provide a number of advantageous effects. For example, continuous flow may facilitate the accelerated implementation and/or removal of heat and/or pressure applied to the slurry. This may assist in achieving the desired rates of mass and heat transfer, heating/cooling and/or pressurisation/de-pressurisation. Continuous flow may also allow the retention time to be tightly controlled. Without limitation to a particular mode of action, it is postulated that the increased speed of heating/cooling and/or pressurisation/de-pressurisation facilitated by continuous flow conditions along with the capacity to tightly regulate retention time assists in preventing the occurrence of undesirable side-reactions (e.g. polymerisation) as the slurry heats/pressurises and/or cools/de-pressurises. Continuous flow is also believed to enhance reactions responsible for upgrading the heavy oil by virtue of generating mixing and shear forces believed to aid in emulsification.

Accordingly, in preferred embodiments the methods of the present invention are performed under conditions of continuous flow. As used herein, the term "continuous flow" refers to a process wherein slurry comprising a mixture of feedstock (e.g. heavy oil, heavy oil residues, polymeric materials including plastic, and any combination thereof) and an aqueous solvent (which may further comprise any one or more of solid substrate, additive catalyst(s) and/or other additional components) is subjected to:

(a) heating and pressurisation to a target temperature and pressure, (b) treatment at target temperature(s) and pressure(s) for a defined time period (i.e. the "retention time"), and (c) cooling and de-pressurisation, while the slurry is maintained in a stream of continuous movement along the length (or partial length) of a given surface. It will be understood that "continuous flow" conditions as contemplated herein are defined by a starting point of heating and pressurisation (i.e. (a) above) and by an end point of cooling and de-pressurisation (i.e. (c) above).

Continuous flow conditions as contemplated herein imply no particular limitation regarding flow velocity of the slurry provided that it is maintained in a stream of continuous movement.

Continuous flow conditions may be facilitated, for example, by performing the methods of the invention in a suitable reactor apparatus. A suitable reactor apparatus will generally comprise heating/cooling, pressurising/de-pressuring and reaction components in which a continuous stream of slurry is maintained.

The use of a suitable flow velocity (under conditions of continuous flow) may be advantageous in preventing scale-formation along the length of a particular surface that the slurry moves along (e.g. vessel walls of a reactor apparatus) and/or generating an effective mixing regime for efficient heat transfer into and within the slurry.

Upgraded Products and Biofuels

The methods of the present invention may be used to provide products, including upgraded products from feedstocks comprising heavy oils and/or biofuels/bio-oils from feedstocks comprising polymeric materials (e.g. plastic). In some embodiments, the upgraded products are lighter oils.

Upgraded products generated in accordance with the methods of the invention may comprise a number of advantageous features in comparison to the heavy oil feedstock, non-limiting examples of which include any one or more of reduced oxygen content, increased hydrogen content, increased energy content, increased stability, lower boiling point, higher specific gravity, reduced viscosity, and/or increased distillation capacity.

In some embodiments, the upgraded product has a viscosity that is at least 50 centipoise lower, at least 100 centipoise lower, at least 200 centipoise lower, at least 500 centipoise lower least 1000 centipoise lower, at least 1500 centipoise lower, at least 2000 centipoise lower, at least 3000 centipoise lower, at least 4000 centipoise lower, at least 5000 centipoise lower, or at least 10,000 centipoise lower or at least 50,000 centipoise lower than the viscosity of the heavy oil at 40° C.

In some embodiments, the upgraded product has an API gravity that is at least 1°, at least 2°, at least 5°, at least 10°, at least 15°, or at least 20° higher than the API gravity of the heavy oil.

In some embodiments, the upgraded product has a density that is at least 10 kg/m$^3$ lower, at least 20 kg/m$^3$ lower, at least 30 kg/m$^3$ lower, at least 40 kg/m$^3$ lower, at least 50 kg/m$^3$ lower, at least 100 kg/m$^3$ lower, at least 200 kg/m$^3$ lower than the density of the heavy oil.

In some embodiments, the upgraded product has an AEBP that is at least 20° C., at least 30° C., at least 40° C., at least 250° C., at least 60° C., at least 70° C., at least 80° C., at least 90° C., at least 100° C., at least 150° C., or at least 200° C. lower than the AEBP of the heavy oil.

In some embodiments, the proportion of the upgraded product capable of being distilled is at least 5%, at least 10%, at least 15%, at least 20%, at least 25%, at least 30%, at least 40%, at least 50%, at least 60%, at least 70%, at least 80% or at least 90% more than the proportion of the heavy oil capable of being distilled.

In some embodiments, the upgraded product may have a density that is at least 0.5%, at least 1%, at least 2%, at least 5%, at least 10%, at least 15%, or at least 20% lower than the density of heavy oil in the feedstock when measured at the same temperature between 15 and 60 degrees centigrade.

The methods of the present invention may be used to produce biofuel (e.g. bio-oil) from feedstock material (e.g. polymeric material including plastic). The nature of the biofuel product may depend on a variety of different factors including, for example, the organic material feedstock, and/or the reaction conditions/reagents utilised in the methods.

In certain embodiments, the biofuel product may comprise one or more of bio-oil, oil char (e.g. carbon char with bound oils), soluble light oil, gaseous product (e.g. methane, hydrogen, carbon monoxide and/or carbon dioxide), alcohol (e.g. ethanol, methanol and the like), and biodiesel.

In certain embodiments, a biofuel may comprise solid and/or liquid and/or gas phases. The solid phase may comprise a high carbon char. The liquid phase may comprise bio-oil. The gaseous product may comprise methane, hydrogen, carbon monoxide and/or carbon dioxide.

Biofuels produced in accordance with the methods of the invention may comprise a number of advantageous features, non-limiting examples of which include reduced oxygen content, increased hydrogen content, increased energy content and increased stability.

A bio-oil product produced in accordance with the methods of the invention may comprise an energy content of greater than about 25 MJ/kg, preferably greater than about 30 MJ/kg, more preferably greater than about 32 MJ/kg, still more preferably greater than about 35 MJ/kg, and even more preferably greater than about 37 MJ/kg. 38 MJ/kg or 39 MJ/kg. The bio-oil product may comprise less than about 15% wt db oxygen, preferably less than about 10% wt db oxygen, more preferably less than about 8% wt db oxygen and still more preferably less than about 7% wt db oxygen. The bio-oil product may comprise greater than about 6% wt db hydrogen, preferably greater than about 7% wt db hydrogen, more preferably greater than about 8% wt db hydrogen, and still more preferably greater than about 9% wt db hydrogen. The molar hydrogen; carbon ratio of a bio-oil of the invention may be less than about 1.5, less than about 1.4, less than about 1.3, or less than about 1.2.

A bio-oil produced in accordance with the methods of the invention may comprise, for example, any one or more of the following classes of compounds; phenols, aromatic and aliphatic acids, ketones, aldehydes, hydrocarbons, alcohols, esters, ethers, furans, furfurals, terpenes, polycyclics, oligo- and polymers of each of the aforementioned classes, plant sterols, modified plant sterols, asphaltenes, pre-asphaltenes, and waxes.

Biofuels produced in accordance with the methods of the invention may be cleaned and/or separated into individual components using standard techniques known in the art.

For example, solid and liquid phases of biofuel product may be filtered through a pressure filter press, or rotary vacuum drum filter in a first stage of solid and liquid separation. The solid product obtained may include a high carbon char with bound oils. In certain embodiments, the oil may be separated from the char, for example, by thermal distillation or by solvent extraction. The liquid product obtained may contain a low percentage of light oils, which may be concentrated and recovered though an evaporator.

A bio-oil product may be recovered by decanting or by density separation. Water soluble light oils may be concentrated and recovered through an evaporator. Bio-oils produced in accordance with the methods of the invention may be polished or distilled to remove any remaining water or in preparation for further processing. Upgraded products and/or biofuels/bio-oils generated in accordance with the methods of the present invention may be used in any number of applications. For example, they may be used as oil, blended with other fuels or oils, and/or upgraded into higher fuel products.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

EXAMPLES

The invention will now be described with reference to specific examples, which should not be construed as in any way limiting Example 1; Oil Residue Upgrading

SUMMARY

A technology was developed to upgrade low-value feed stocks to high-value products. One such feed stock is the lube oil residue (LOR) gathered from the bottoms fraction of a vacuum distillation plant for recycling used lube oil. This residue is made up of the non-distillable fraction of the oil and contains contaminating components retained in the oil through use and additive residues.

Lube oil residue was successfully processed. About 70% of the resulting upgraded LOR could be distilled to a strongly upgraded oil product after treatment. By contrast only about 20% of the as received LOR could be distilled under comparable conditions.

The results confirm that supercritical water upgrading of LOR using the disclosed methods provides substantial benefits:
(i) A large fraction of the LOR is cracked to lighter products, leading to hydrocarbon oils boiling in the diesel and heavy gas oil ranges;
(ii) The residue remaining after upgrading followed by distillation is reduced to approximately one quarter of its original volume, with potential for further reduction by further processing.

These outcomes provide the possibility of deriving revenue-generating products from the upgraded hydrocarbon oils while substantially reducing disposal costs for residual materials.

INTRODUCTION

Lube oil is a commonly used product designed to perform several functions including the lubrication of moving machinery parts as well as cooling, cleaning and corrosion control. However, after a certain amount of usage, lube oil becomes unfit for further use due to the accumulation of contaminants and chemical changes in the oil. The main contaminants include:
(i) Combustion products
  Water.
  Soot and carbon.
  Fuel.
(ii) Abrasives
  Road dust.
  Wear metals.
(iii) Chemical products
  Oxidation products.
  Depleted additive remnants.

It is possible to recycle the lube oil and such re-refined lubricants have been produced. So as to recycle the oil, it is necessary to remove the afore-mentioned contaminants and restore the oil to its original condition. This is achieved first through dehydration and then diesel stripping. The diesel stripping is a vacuum distillation process that extracts the different fractions including light fuel or diesel; lubricating oil; and lube oil residue, or LOR.

The LOR makes up the non-distillable part of the feed stock and is the only fraction of the three that is, for the most part, considered useless for commercial applications though it has been used successfully as bitumen extender in roads. It contains all of the carbon, wear metals, and degraded additives as well as most of the lead and oxidation products.

The objective of these trials was to ascertain indicative yields of saleable products from LOR using the methods described herein.

Approximately 100 kg of LOR on a dry basis was received from an Australian supplier. The feed stock for the plant was prepared by mixing the LOR with demineralised water to make a mixture that was pumpable in the reactor plant. Such preparation will not be necessary in a dedicated upgrading unit, however some initial dilution with water was required in this case to reduce feed viscosity because the pilot plant used lacks heated feed systems. Additionally, water is the upgrading medium in the hydrothermal process used and therefore some water must be added. The mixture was stabilised by heating it to 65° C. and processing it through a colloid mill so as to both reduce the droplet size of the LOR suspended in the water and ensure that the mixture was homogeneous. During the trial runs, the slurry was maintained as homogenous in the feed tank through the use of a stirrer.

Process Outline

A simplified process flow diagram for the process used is shown in FIG. 1.

Trial 1

The reactor temperature for this trial run ranged between 395° C. and 405° C. at 260 Bar. The estimated residence time of the LOR in the reactor was 25 minutes and a mass balance for the run is shown below in Table 3.

Trail 1 produced samples of upgraded LOR which had been processed by the technology. Analysis of these samples is presented in further below.

TABLE 3

| LOR trial 1 simplified mass balance | |
|---|---|
| Production Yields | % dry basis (db) |
| Oil (as emulsion) | 87.5 |
| NCG Gas | 7.0 |
| Difference | 5.5 |

Notes to Table:
Db; dry basis

No obvious solid residues were detected in samples of the oil (as an oil in water emulsion). Small amount of solids may have quickly settled out of the emulsion in the product tank. The difference term includes such solids, any water made in the reactor and also any mass unaccounted for.

The mass balance closed to within 5.5%, a good outcome for a relatively short pilot plant run. The upgraded oil product was recovered as a stable oil-in-water emulsion, from which the oil was subsequently recovered in the laboratory. The emulsion formed as a result of the surfactants present in the LOR and also due to a relatively small orifice size used for depressurization in this test run, the overall effect being similar to a homogenizer. The mass unaccounted for in the run was the equivalent of approximately 0.4 kg and may have included LOR coating the pipe walls of the feed system and collection tank as well as slight inaccuracies in the mass totalisers into the plant.

The acronym SCULOR (Super-Critically Upgraded Lube Oil Residue) to distinguish the upgraded material from the feed LOR.

Trial 2

A second trial run on the SPP was completed on the 24th March 2015. Based on the results of the first run, some improvements to the processing method were made:
(i) The LOR/water mixture was heated to reaction temperature directly instead of partially by injecting supercritical steam. This increased the concentration of LOR in the reactor.
(ii) Capillaries rather than nozzles were used for pressure letdown to reduce emulsion formation.
(iii) A shorter reactor was used to reduce residence time, a desirable outcome as it reduces reactor cost.

The reactor temperature for this trial run ranged between 415° C. and 425° C. at 260 Bar, so slightly hotter than the previous run. Direct heating the feed rather than using supercritical water addition boosted the oil concentration in the reactors from 10% to 28%. The estimated residence time of the LOR in the reactor was 6 minutes. The pH of the water in the product tank was lowered by addition of acid to de-stabilize emulsion droplets, and the SCULOR was recovered as an oil phase floating on a water phase after cooling. A mass balance after product acidification for the run is shown below in Table 4.

TABLE 3

LOR trial simplified mass balance Trial 2 after acidification

| Production Yields | % dry basis (db) |
|---|---|
| Oil | 78.5 |
| NCG Gas | 11.8 |
| Water Phase | |
| Ether extractables | 0.28 |
| Residues | 2.4 |
| Difference | 5.5 |

Notes to Table.

The water phase was tested by solvent extraction to confirm the virtual absence of oil product Extractable into either. The water phase residue includes non-ether soluble organics and inorganic salts from the feed LOR. Difference term includes any water made in the reactor and also any mass unaccounted for.

The mass balance was again well closed, to within 5.2%.

Oil Analysis

Figure 2:
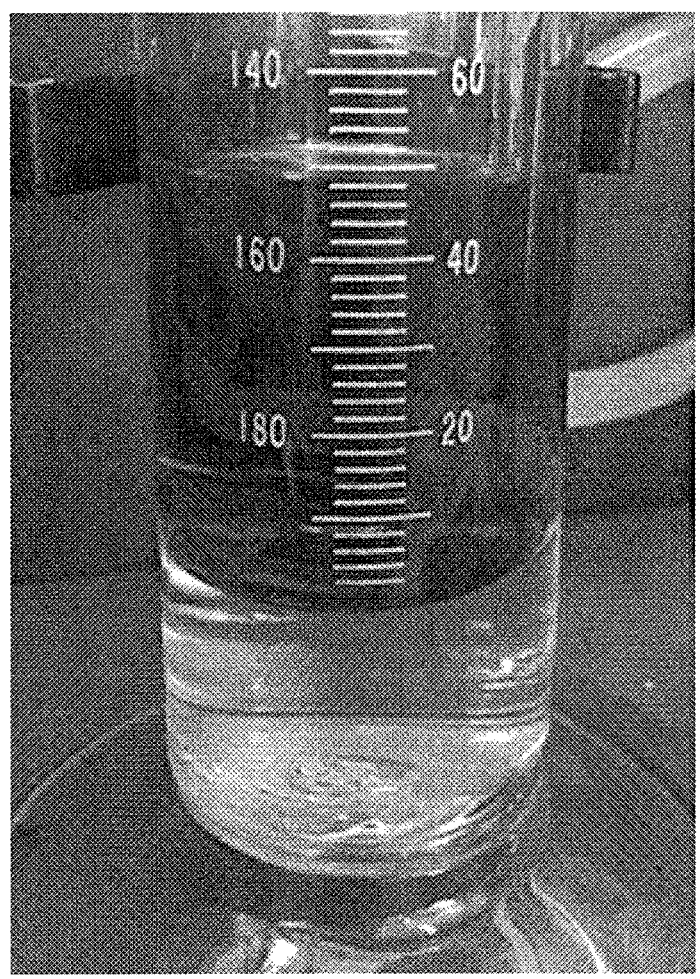
FIG. 2 is a photograph of Super Critical Upgraded Lube Oil Residue (SCULOR)
Figure 3A:
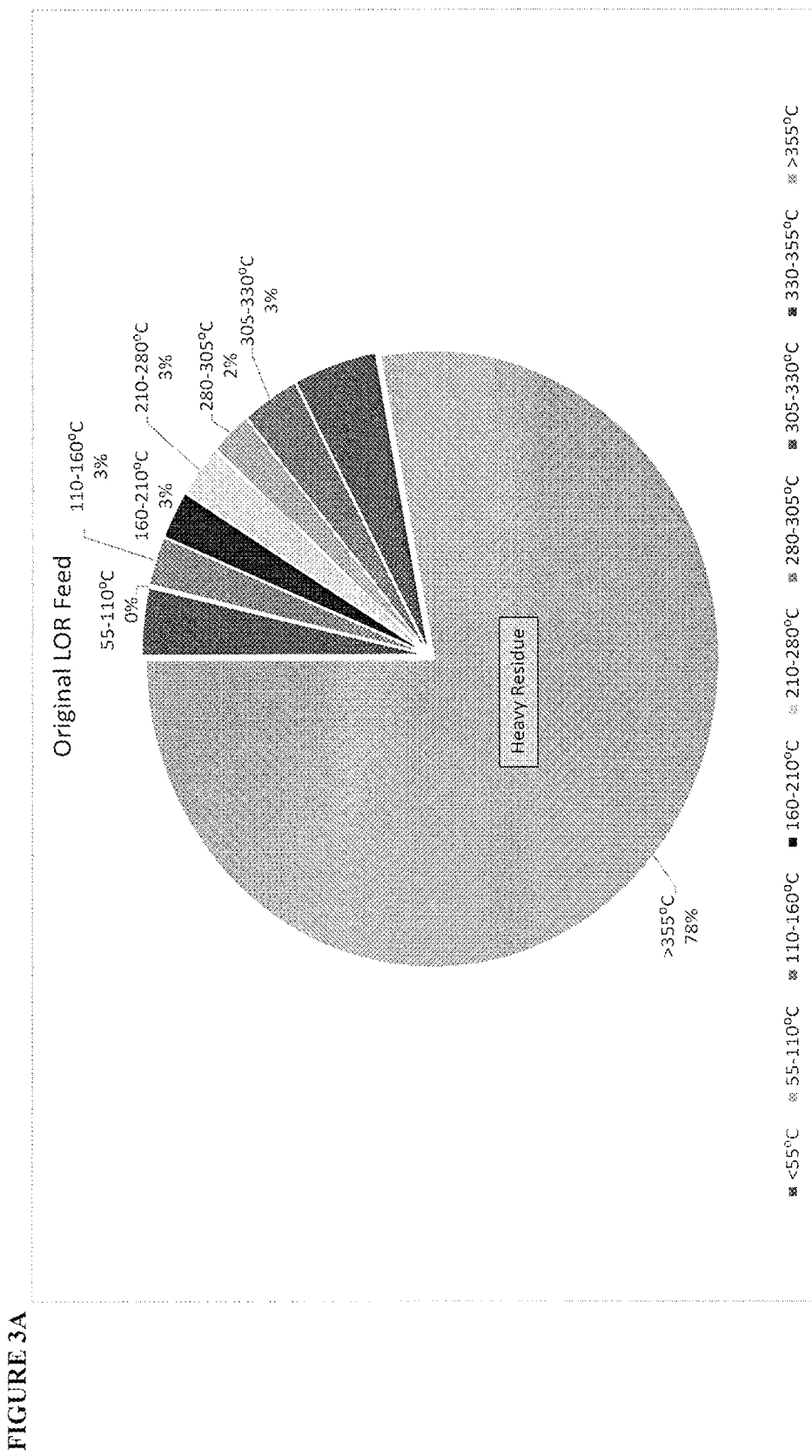
FIG. 3A shows a pie chart of vacuum distillation fractions at 10 Torr for dry basis for original LOR feed.
Figure 3B:
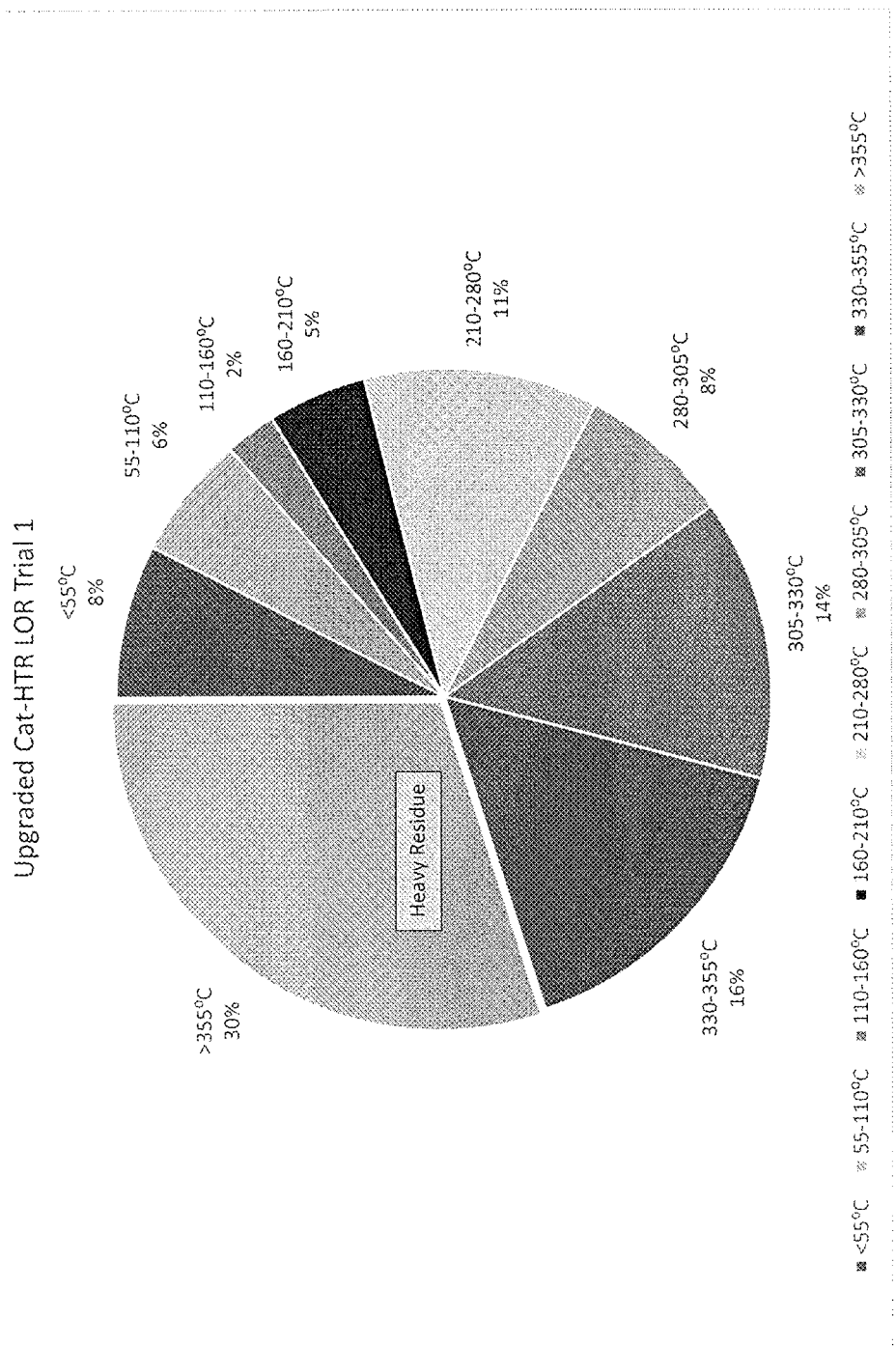
FIG. 3B shows a pie chart of vacuum distillation fractions at 10 Torr for ugraded LOR from Trial 1.
Figure 3C:
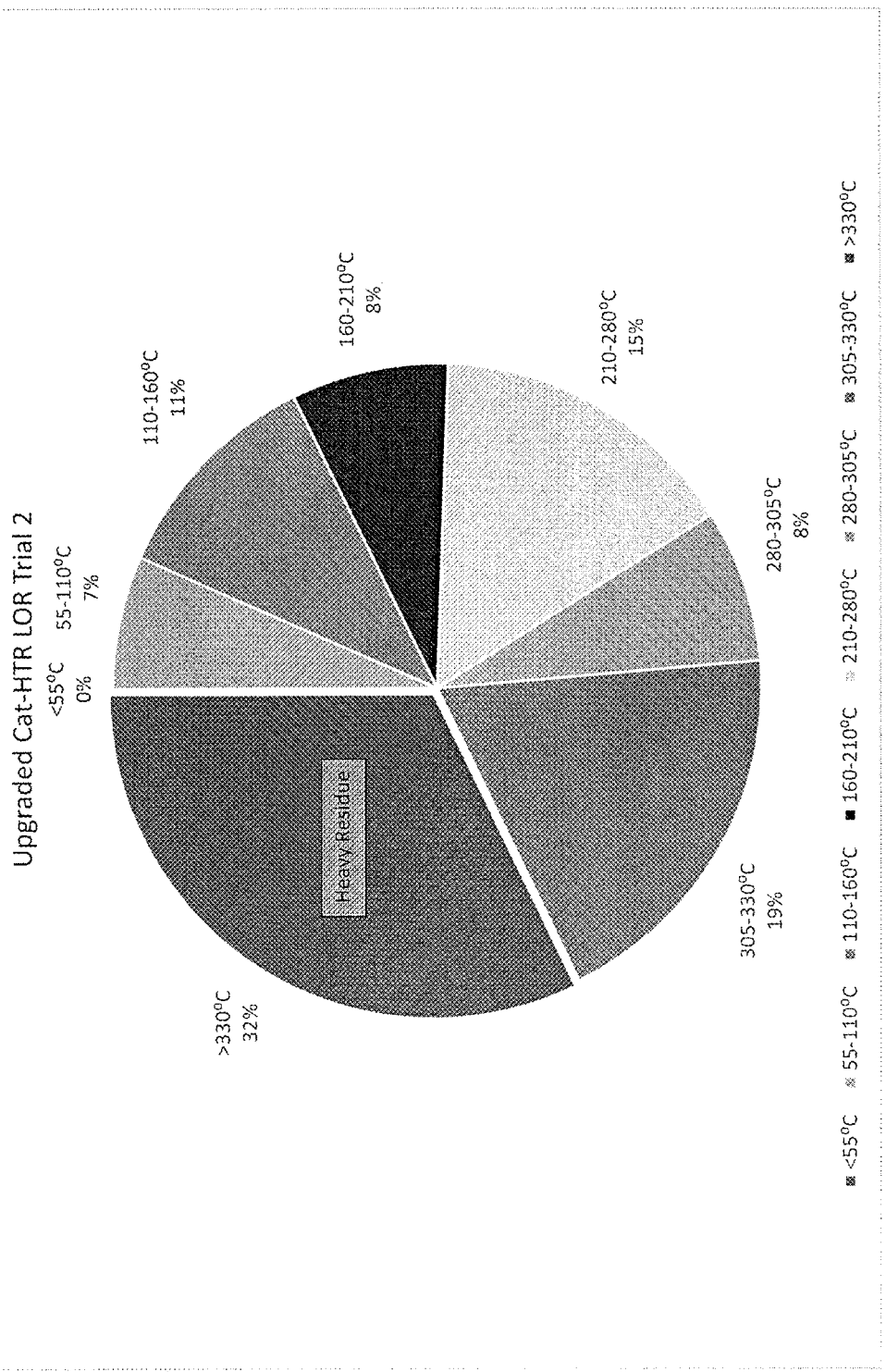
FIG. 3C shows a pie chart of vacuum distillation fractions at 10 Torr for upgraded LOR from Trial 2.

The upgraded LOR, SCULOR, was distilled under reduced pressure in an ASTM D1160 type apparatus. The distilled material was dramatically improved in appearance and viscosity compared to the LOR, as illustrated in FIG. 2. The upgrading process substantially changed the composition of the LOR, as illustrated by FIGS. 3A-3C. Substantial cracking has increased the distillable material from about 20% of the LOR to about 70% of the SCULOR. FIG. 3A and FIG. 3B the most prominent change was the large increase in lighter oil fractions and reduction in the heavy residue. The higher temperatures in Trial 2 (FIG. 3C) produced slightly more of mid-boiling fractions than Trial 1 (FIG. 3B), however the low boiling fractions below 110° C. were reduced, presumably having been cracked to volatile vapours, consistent with a higher NCG gas yield in Trial 2 (see, FIG. 3C). Roughly 40% of the distilled material boils approximately in the diesel range, note that the boiling ranges at a reduced pressure of 10 torr (13 mbar). The lower boiling fractions contain some polar material, discussed further below.

Figure 4:
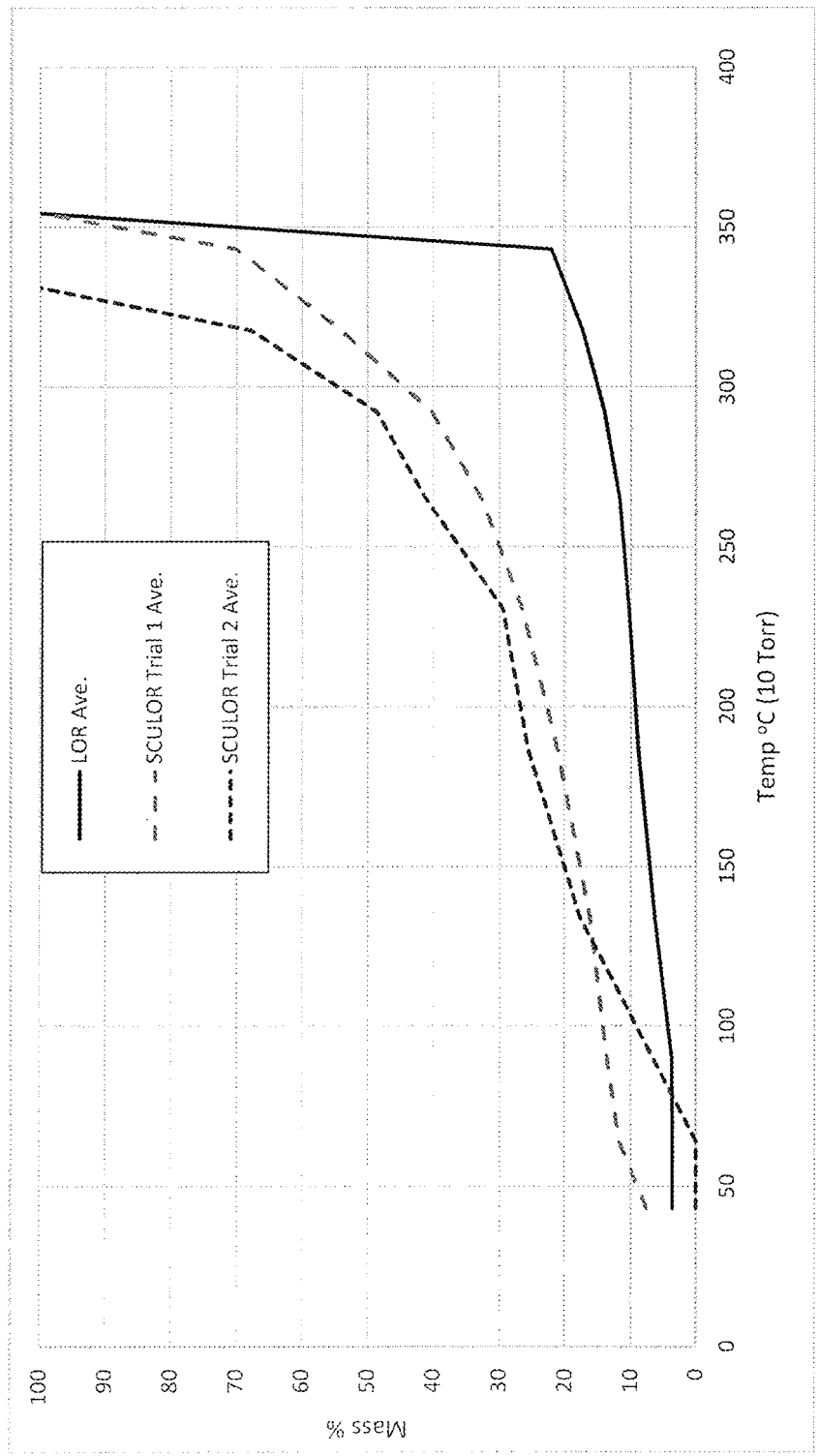
FIG. 4 is a graph of vacuum distillation curves for the feed lube oil residue (LOR) and product after hydrothermal upgrading under supercritical conditions (SCULOR)

FIG. 4 shows approximate boiling point curves of the SCULOR products from Trials 1 and 2, constructed by joining the means of the upper and lower boiling ranges of the fractions.

Results of elemental analysis of some distillate fractions from Trial 1 are shown in Table 5. The three lowest boiling fractions contained some polar material (lower layer) that was denser than the oil fraction (upper layer). Separation of the upper and lower layers may not have been complete, it is probable that some contamination of the hydrocarbon layer with the polar layer occurred, and vice versa, and this should be borne in mind when examining the analysis data. The polar material presumably originates from additives and contaminants in the lube oils (e.g. glycols, sulphonates) and may include some water. The higher boiling fractions are predominantly hydrocarbon in nature with a molar hydrogen to carbon ratio close to two, indicating that they are likely mainly paraffins. Heteroatom contents are quite low.

TABLE 5

Elemental composition of the various franctions obtained by vacuum distillation of the Cat-HTR lube oil residue (SCULOR)—Trial 1

| Fraction | Boiling range at 10 torr (° C.) | Density | Elemental Composition (%) | | | | |
|---|---|---|---|---|---|---|---|
| | | | C | H | N | S | O |
| 1 top | 56.0-72.2 | 0.815 | 82.18 | 14.62 | <0.05 | 0.49 | 2.68 |
| 1 bottom | 56.0-72.3 | 1.086 | 41.10 | 10.39 | 0.34 | <0.05 | 48.13 |
| 2 top | 72-3-107.7 | 0.817 | — | — | — | — | — |
| 2 bottom | 72.3-107.8 | 1.087 | — | — | — | — | — |
| 3 top | 107.7-160.0 | 0.912 | 77.68 | 13.80 | 0.17 | 0.13 | 8.23 |
| 3 bottom | 107.7-160.1 | 1.035 | 52.70 | 10.16 | 0.90 | 0.18 | 36.07 |
| 4 | 160.1-212.7 | 0.865 | 81.53 | 14.45 | 0.30 | 0.51 | 3.23 |
| 5 | 212.7-248.5 | 0.873 | 83.48 | 14.80 | 0.22 | 0.40 | 1.11 |
| 6 | 248.5-281.0 | 0.875 | 83.42 | 14.87 | 0.20 | 0.32 | 1.20 |
| 7 | 281.0-303.5 | 0.89 | 83.90 | 14.84 | 0.15 | 0.25 | 0.87 |
| 8 | 303.5-331.8 | 0.888 | 85.22 | 14.18 | 0.08 | 0.26 | 0.28 |
| 9 | 331.8-354.3 | 0.883 | 86.04 | 13.76 | 0.17 | 0.08 | 0.00 |
| Residue | 354.3+ | | | | | | |

Note to Table: Oxygen obtained by difference

Gas Analysis

Table 6 shows the non-condensable gases produced from the upgrading run. The gas yields and compositions suggest the presence of significant cracking of the larger carbon-chain molecules of the LOR. The higher abundance of $C_1$-$C_3$ hydrocarbons in Trial 2 is consistent with more cracking activity at a higher reaction temperature. The concentration and absolute abundance of hydrogen sulphide in Trial 1 is probably too low for the measurement to be reliable.

TABLE 6

NCG Composition from LOR Cat-HTR Trials

| Gas | Trial 1 LOR feed 40% wt. with SCW injection Volume % | Trial 2 LOR Feed 28% wt. Electrical heating Volume % |
|---|---|---|
| Methane | 5.51 | 11.37 |
| Carbon Monoxide | <0.015 | 0.26 |
| Hydrogen | 31.89 | 22.95 |
| Ethylene | 2.81 | 6.10 |
| Ethane | 3.20 | 5.94 |
| Propylene | 3.67 | 8.48 |
| Propane | 3.16 | 8.23 |

TABLE 6-continued

NCG Composition from LOR Cat-HTR Trials

| Gas | Trial 1 LOR feed 40% wt. with SCW injection Volume % | Trial 2 LOR Feed 28% wt. Electrical heating Volume % |
|---|---|---|
| Carbon Dioxide | 49.70 | 35.27 |
| Hydrogen Sulphide | <0.015 | 1.40 |
| NCG Yield, weight % | 7.0 | 11.8 |

CONCLUSIONS

The trials described in this report confirm that supercritical water upgrading of LOR using the disclosed methods provides substantial benefits:
 (i) A large fraction of the LOR is cracked to lighter products, leading to hydrocarbon oils boiling in the diesel and heavy gas oil ranges
 (ii) The residue remaining after upgrading followed by distillation is reduced to approximately one quarter of its original volume, with potential for further reduction by further processing These outcomes provide the possibility of deriving revenue-generating products from the upgraded hydrocarbon oils while substantially reducing disposal costs for residual materials.

Abbreviations
 Db; Dry Basis
 IER; Ignite Energy Resources Pty Ltd
 LOR; Lube Oil Residue
 NCG; Non-Condensable Gas
 SCO; Synthetic Crude Oil
 SCULOR; Super-Critically Upgraded Lube Oil Residue
 SPP; Small Pilot Plant Example 2; Oil Residue Upgrading in Combination with Polymers

INTRODUCTION

Example 2 is a Prophetic Example

Plastic and/or rubber and/or other polymeric material (polymers) may be used in combination with heavy oil components of the feedstock mixture for cracking in the reactor. Accordingly, plastic and/or rubber and/or other polymeric material (polymers) may be added to the feedstock mixture for cracking in the reactor according to the methods described below.

The polymers may be characterised in part by their glass transition temperatures $T_g$ and/or their melting temperatures Tm in the case of semi-crystalline or crystalline polymers. Above $T_g$ polymers generally exhibit rubbery characteristics. Non-limiting examples of glass transition temperatures and melting temperatures are given below in Table 7.

TABLE 7

$T_g$ and $T_m$ temperatures of exemplary polymers

| Polymer | $T_m$ ° C. | $T_g$ ° C. |
|---|---|---|
| Polyethylene (PE) | 135 | −68 |
| Polypropylene (PP) | 176 | −8 |
| Polystyrene (PS) | 240 | 100 |
| Poly(methyl methacrylate) PMMA | 200 | 105 |
| Poly(vinyl chloride) PVC | 180 | 82 |
| Poly(vinylidene fluoride) (PVDF) | 210 | −39 |
| Polyisoprene | 28 | −70 |
| Nylon-6,6 | 265 | 50 |

Source; Williams (1971) cited in. "Introduction to Polymer Science and Chemistry; A Problem-Solving Approach" Second Edition, Manas Chanda, CRC Press, 11 Jan. 2013.

Non limiting examples of polymers, plastics and rubbers that can be treated according to the methods of Examples 2-X include Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly(vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly (Phenol-formaldehyde) (PF), Epoxies, Polyacetal, (Acetal), Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), polycondensate, Polyetheretherketone (PEEK), Polyetherimide (PEI), Polyethersulfone (PES), Polyethylenechlorinates, (PEC), Polyimide, (PI), Polymethylpentene (PMP), Poly (phenylene Oxide) (PPO), Polyphenylene Sulfide (PPS), Polyphthalamide, (PTA), Polysulfone (PSU), Polyurethane, (PU), Poly(vinylidene chloride) (PVDC), Poly(tetrafluoroethylene) PTFE, Poly(fluoroxy alkane) PFA, Poly(siloxanes), silicones, thermosplastics, thermosetting polymers, natural rubbers, tyre rubbers, ethylene propylene diene monomer rubbers EPDM, chloroprene rubbers, acrylonitrile butadiene (nitrile) rubbers, polyacrylate rubbers, Ethylene Acrylic rubbers, Styrene-butadiene rubbers, Polyester urethane rubbers, Polyether urethane rubbers, Fluorosilicone rubbers, silicone rubbers, and copolymers and mixtures thereof.

Polymers treated according to the methods of Examples 2.1-2.10 may be in the form of mixed or sorted waste plastics and in some cases may be contaminated with organic and inorganic impurities. The waste plastic material may require some pre-processing before being processed according to the methods of the present invention. For example, the waste plastic may require sieving or screening to remove abrasive particles.

Without limiting the mode of action polymers treated according to the methods of Examples 2-4 may be cracked to liquids having lower boiling and melting points or they may directly or indirectly act as sources of hydrogen which is then incorporated into the product liquids.
LOR=lube oil residue
PE=polyethylene LDPE=Low density polyethylene
Polymer=a polymeric, plastic, elastomeric or rubber material or mixture of such materials.

Example 2.1

PE is ground to a powder and suspended in LOR at a temperature of 70° C. or greater such that the viscosity of the continuous phase is sufficiently low to form a pumpable suspension. At elevated temperatures the PE may begin to dissolve into the oil. For example polyethylene solubility in mineral oil increased from about 20 g/100 g at 50° C. to about 100 g/100 g at 65° C. according to Litkovets et al. [Chemistry and Technology of Fuels and Oils, December 1988, Volume 24, Issue 12, pp 556-559, Solubility of polyethylene in a mineral oil, E. A. Litkovets, I. M. Bolyuk, A. M. Zeliznyi]. The melting temperature of LDPE is approximately 110° C. The mixture is pressurized using a high-pressure pump and is subsequently contacted with supercritical steam and raised to the reaction temperature. The contact with the supercritical steam provides water as an aqueous solvent and reactant for the cracking reactions. The mixture is continuously pumped through a reaction vessel to give a residence time for cracking reactions to occur. At the end of the residence time the mixture is optionally cooled and then depressurized to a pressure close to atmospheric pressure in one or more depressurization steps. After depressurization the mixture of reaction products is separated into four main phases being a gas or vapour phase, an oil phase, a water phase and a solid phase. The oil phase contains the desired cracked oil products that can be separated from the water and solid phases by physical means widely known in the art for example centrifugation, decantation, filtration, and distillation.

The residence time is between about 1 minute and about 30 minutes (e.g. between about 1 minute and about 10 minutes). The reaction temperature is between about 380° C. and 480° C. (e.g. approximately 450° C., or approximately 400° C.). The initial mixture is between about 1% PE by weight and about 40% PE by weight and between about 99% and about 60% LOR by weight. The reaction pressure is between about 40 bar and about 300 bar and preferably between about 180 bar and 250 bar.

Optionally, as illustrated in FIG. 1, the reaction mixture is pre-heated in a heater before contact with the supercritical steam. Optionally the heater is in the form of a heat exchanger which uses heat recovered from the cooler also illustrated in FIG. 1, so as to reduce the amount of external heat input required to accomplish the processing of the feedstock. In this example the temperature of the mixture leaving the pre-heater is in the range 150° C.-300° C.

Example 2.2

Polymer is ground to a powder and suspended in heavy oil at a temperature sufficient to enable formation of pumpable suspension, for example between about 30° C. and about 200° C. The polymer and heavy oil may be mixed in any proportion. The mixture is pressurized using a high-pressure pump and is subsequently contacted with supercritical steam and raised to the reaction temperature. The contact with the supercritical steams provides water as an aqueous solvent and reactant for the cracking reactions. The mixture is continuously pumped through a reaction vessel to give a residence time for cracking reactions to occur. At the end of the residence time the mixture is optionally cooled and then depressurized to a pressure close to atmospheric pressure in one or more depressurization steps. After depressurization the mixture of reaction products is separated into four main phases being a gas or vapour phase, an oil phase, a water phase and a solid phase. The oil phase contains the desired cracked oil products that can be separated from the water and solid phases by physical means widely known in the art for example centrifugation, decantation, filtration, and distillation.

The residence time is between about 1 minute and about 30 minutes (e.g. between about 1 minute and about 10 minutes). The reaction temperature is between about 380° C. and 480° C. (e.g. approximately 450° C., or approximately 400° C.). The reaction pressure is between about 40 bar and about 300 bar.

Optionally, as illustrated in FIG. 1, the reaction mixture is pre-heated in a heater before contact with the supercritical steam. Optionally the heater is in the form of a heat exchanger which uses heat recovered from the cooler also illustrated in FIG. 1, so as to reduce the amount of external heat input required to accomplish the processing of the feedstock.

Example 2.3

PE is added to LOR in a stirred heating tank at a temperature of 50-90° C. The mixture is stirred until the PE dissolves into the oil. For example polyethylene solubility in mineral oil increased from about 20 g/100 g at 50° C. to about 100 g/100 g at 65° C. according to Litkovets et al. [Chemistry and Technology of Fuels and Oils, December 1988, Volume 24, Issue 12, pp 556-559, Solubility of polyethylene in a mineral oil, E. A. Litkovets, I. M. Bolyuk, A. M. Zeliznyi]. The mixture is pressurized using a high-pressure pump and is subsequently contacted with supercritical steam and raised to the reaction temperature. The contact with the supercritical steam provides water as an aqueous solvent and reactant for the cracking reactions. The mixture is continuously pumped through a reaction vessel to give a residence time for cracking reactions to occur. At the end of the residence time the mixture is optionally cooled and then depressurized to a pressure close to atmospheric pressure in one or more depressurization steps. After depressurization the mixture of reaction products is separated into four main phases being a gas or vapour phase, an oil phase, a water phase and a solid phase. The oil phase contains the desired cracked oil products that can be separated from the water and solid phases by physical means widely known in the art for example centrifugation, decantation, filtration, and distillation.

The residence time is between about 1 minute and about 30 minutes (e.g. between about 1 minute and about 10 minutes). The reaction temperature is between about 380° C. and 480° C. (e.g. approximately 450° C., or approximately 400° C.). The initial mixture is between about 1% PE by weight and about 40% PE by weight and between about 99% and about 60% LOR by weight. The reaction pressure is between about 40 bar and about 300 bar and preferably between about 180 bar and 250 bar.

Optionally, as illustrated in FIG. 1, the reaction mixture is pre-heated in a heater before contact with the supercritical steam. Optionally the heater is in the form of a heat exchanger which uses heat recovered from the cooler also illustrated in FIG. 1, so as to reduce the amount of external heat input required to accomplish the processing of the feedstock. In this example the temperature of the mixture leaving the pre-heater is in the range 150-300° C.

Example 2.4

Polymer is added to heavy oil in a stirred heating tank at a temperature of about 50-200° C. The mixture is stirred until the polymer dissolves into the oil. For example polyethylene solubility in mineral oil increased from about 20 g/100 g at 50° C. to about 100 g/100 g at 65° C. according to Litkovets et al. [Chemistry and Technology of Fuels and Oils, December 1988, Volume 24, Issue 12, pp 556-559, Solubility of polyethylene in a mineral oil, E. A. Litkovets, I. M. Bolyuk, A. M. Zeliznyi]. The mixture is pressurized using a high-pressure pump and is subsequently contacted with supercritical steam and raised to the reaction temperature. The contact with the supercritical steam provides water as an aqueous solvent and reactant for the cracking reactions. The mixture is continuously pumped through a reaction vessel to give a residence time for cracking reactions to occur. At the end of the residence time the mixture is optionally cooled and then depressurized to a pressure close to atmospheric pressure in one or more depressurization steps. After depressurization the mixture of reaction products is separated into four main phases being a gas or vapour phase, an oil phase, a water phase and a solid phase. The oil phase contains the desired cracked oil products that can be separated from the water and solid phases by physical means widely known in the art for example centrifugation, decantation, filtration, and distillation.

The residence time is between about 1 minute and about 30 minutes (e.g. between about 1 minute and about 10 minutes). The reaction temperature is between about 380° C. and 480° C. (e.g. approximately 450° C., or approximately 400° C.). The reaction pressure is between about 40 bar and about 300 bar. The polymer and heavy oil may be mixed initially in any proportion that provides for a pumpable liquid once heated and stirred. It will be recognized by those skilled in the art that suitable mixtures will depend upon the phase behaviour and mutual solubilities of the polymer and heavy oil phases. For example the initial mixture may comprise 99% by weight polymer and 1% by weight heavy oil or 1% polymer and 99% heavy oil.

Optionally, as illustrated in FIG. 1, the reaction mixture is pre-heated in a heater before contact with the supercritical steam. Optionally the heater is in the form of a heat exchanger which uses heat recovered from the cooler also illustrated in FIG. 1, so as to reduce the amount of external heat input required to accomplish the processing of the feedstock.

Example 2.5

PE is ground to a powder and added to LOR and water. The mixture is stirred or passed through an emulsifier to form an intimately mixed emulsion of the components. The emulsion is optionally stored in a stirred holding tank as a buffer and then pressurized using a high-pressure pump. At elevated temperatures the PE may begin to dissolve into the oil. For example polyethylene solubility in mineral oil increased from about 20 g/100 g at 50° C. to about 100 g/100 g at 65° C. according to Litkovets et al. [Chemistry and Technology of Fuels and Oils, December 1988, Volume 24, Issue 12, pp 556-559, Solubility of polyethylene in a mineral oil, E. A. Litkovets, I. M. Bolyuk, A. M. Zeliznyi]. The melting temperature of LDPE is about 110° C. The mixture is pressurized using a high-pressure pump and is subsequently raised to the reaction temperature by means of a heater or series of heaters. The mixture is continuously pumped through a reaction vessel to give a residence time for cracking reactions to occur. At the end of the residence time the mixture is optionally cooled and then depressurized to a pressure close to atmospheric pressure in one or more depressurization steps. After depressurization the mixture of reaction products is separated into four main phases being a gas or vapour phase, an oil phase, a water phase and a solid phase. The oil phase contains the desired cracked oil products that can be separated from the water and solid phases by physical means widely known in the art for example centrifugation, decantation, filtration, and distillation.

The residence time is between about 1 minute and about 30 minutes (e.g. between about 1 minute and about 10 minutes). The reaction temperature is between about 380° C. and 480° C. (e.g. approximately 450° C., or approximately 400° C.). The initial mixture is between about 1% PE by weight and about 40% PE by weight and between about 90% and about 60% LOR by weight and between about 5% and about 30% water by weight. The reaction pressure is between about 40 bar and about 300 bar and preferably between about 180 bar and 250 bar.

Optionally one or more of the heaters is in the form of a heat exchanger which uses heat recovered from the cooling and/or depressurization of the reaction products, so as to reduce the amount of external heat input required to accomplish the processing of the feedstock.

Example 2.6

Polymer is ground to a powder and added to heavy oil and water. The mixture is stirred or passed through an emulsifier to form an intimately mixed emulsion of the components. The emulsion is optionally stored in a stirred holding tank as a buffer and then pressurized using a high-pressure pump. The mixture is pressurized using a high-pressure pump and is subsequently raised to the reaction temperature by means of a heater or series of heaters. The mixture is continuously pumped through a reaction vessel to give a residence time for cracking reactions to occur. At the end of the residence time the mixture is optionally cooled and then depressurized to a pressure close to atmospheric pressure in one or more depressurization steps. After depressurization the mixture of reaction products is separated into four main phases being a gas or vapour phase, an oil phase, a water phase and a solid phase. The oil phase contains the desired cracked oil products that can be separated from the water and solid phases by physical means widely known in the art for example centrifugation, decantation, filtration, and distillation.

The residence time is between about 1 minute and about 30 minutes (e.g. between about 1 minute and about 10 minutes). The reaction temperature is between about 380° C. and 480° C. (e.g. approximately 450° C., or approximately 400° C.). The initial mixture is between about 5% water by weight and about 30 water by weight. The polymer and heavy oil may be present in any proportion that gives rise to a pumpable slurry upon mixing. For example the mixture may consist of 10% by weight water, 1% by weight polymer and 89% by weight heavy oil, or 10% by weight water and 89% by weight polymer and 1% by weight heavy oil. The reaction pressure is between about 40 bar and about 300 bar.

Optionally one or more of the heaters is in the form of a heat exchanger which uses heat recovered from the cooling and/or depressurization of the reaction products, so as to reduce the amount of external heat input required to accomplish the processing of the feedstock.

Example 2.7

The method is carried out according to any of Examples 2.1-2.6 with the addition of lignocellulosic biomass to the reaction mixture. For example ground wheat straw is added such that it comprises 10% by weight of the reaction mixture. In another example, pine sawdust is added such that it comprises 10% by weight of the reaction mixture.

Example 2.8

The method is carried out according to any of Examples 2.1-2.7 with the addition of lignite (brown coal) to the reaction mixture as a solid substrate. For example lignite added such that it comprises 10% by weight of the reaction mixture.

Example 2.9

The method is carried out according to any of Examples 2.1-2.8 with the addition of a catalyst after the reaction mixture has been raised to the reaction temperature. For example, sodium hydroxide is added as a base catalyst to the extent of 0.1-10 weight percent of the non-aqueous reactant weight by means of injection of an aqueous sodium hydroxide solution using a high pressure dosing pump.

Example 2.10

The method is carried out according to any of Examples 2.1-2.9 with the additional feature that a part of the product oil is recycled into the process before the reactor, serving in part to reduce the viscosity of the reaction mixture.

Example 3; Processing of Polymers

INTRODUCTION

Example 3 is a prophetic Example

Plastic and/or rubber and/or other polymeric material (polymers) may be used as a feedstock for cracking in the reactor in the absence of heavy oil components. Accordingly, plastic and/or rubber and/or other polymeric material (polymers) may be used as a feedstock for cracking in the reactor according to the methods described below.

The polymers may be characterised in part by their glass transition temperatures $T_g$ and/or their melting temperatures Tm in the case of semi-crystalline or crystalline polymers. Above $T_g$ polymers generally exhibit rubbery characteristics. Non-limiting examples of glass transition temperatures and melting temperatures are given above in Table 7.

Non limiting examples of polymers, plastics and rubbers that can be treated according to the methods of Examples 3-X include Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly(vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly (Phenol-formaldehyde) (PF), Epoxies. Polyacetal, (Acetal), Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), polycondensate, Polyetheretherketone (PEEK), Polyetherimide (PEI), Polyethersulfone (PES), Polyethylenechlorinates, (PEC), Polyimide, (PI), Polymethylpentene (PMP), Poly (phenylene Oxide) (PPO), Polyphenylene Sulfide (PPS), Polyphthalamide, (PTA), Polysulfone (PSU), Polyurethane, (PU), Poly(vinylidene chloride) (PVDC), Poly(tetrafluoroethylene) PTFE, Poly(fluoroxy alkane) PFA, Poly(siloxanes), silicones, thermosplastics, thermosetting polymers, natural rubbers, tyre rubbers, ethylene propylene diene monomer rubbers EPDM, chloroprene rubbers, acrylonitrile butadiene (nitrile) rubbers, polyacrylate rubbers, Ethylene Acrylic rubbers, Styrene-butadiene rubbers, Polyester urethane rubbers, Polyether urethane rubbers, Fluorosilicone rubbers, silicone rubbers, and copolymers and mixtures thereof.

Polymers treated according to the methods of Examples 3.1-3.2 may be in the form of mixed or sorted waste plastics and in some cases may be contaminated with organic and inorganic impurities. The waste plastic material may require some pre-processing before being processed according to the methods of the present invention. For example, the waste plastic may require sieving or screening to remove abrasive particles.

Without limitation to a mode of action, one advantage of the methods described herein over existing methods of recycling plastics waste is that thermosetting plastics, and polymers containing fillers and extenders can be converted to hydrocarbon liquids by means of the invention. Thermosetting plastics or polymers in general cannot be melted into a liquid state to make them suitable for feeding to continuous cracking or recycling processes. Polymers, plastics or rubbers containing fillers and extenders, for example, carbon black, silica, gypsum, calcium carbonate (limestone), kaolin (clay) and alumina, cannot effectively be reprocessed by pyrolysis or catalytic or thermal cracking because of the problems associated with the inorganic fillers. In the present invention the inorganic fillers are separated from the oil products during the hydrothermal reaction and subsequent phase separation and are recovered as a dense solid phase or as an aqueous suspension (see Examples 3.1-3.2).

Without limiting the mode of action another advantage of the methods described herein is that mixtures of plastics, for example plastic wastes or End of Life (EOL) plastic wastes containing chlorine-containing plastics such as poly(vinyl chloride) (PVC) can be processed without producing environmentally damaging concentrations of chlorinated dioxins and furans, sometimes known as dioxin-like compounds (DLCs). Production of DLCs is a substantial problem for combustion and pyrolysis of plastics or polymer mixes containing PVC. In the methods described herein, organically-bonded chlorine contained in polymers with carbon-chlorine such as PVC may react to become inorganic chlorine dissolved in the aqueous phase, in the form of, for example, hydrochloric acid and/or sodium chloride and/or potassium chloride and/or calcium chloride. The methods described herein provide analogous advantages in the treatment of polymers or plastics containing bromine.

In some embodiments the methods described herein may be used to treat mixed plastics and polymers as opposed to largely pure individual feeds of polymers such as PE or PP. Without limiting the mode of action, some plastics (e.g. polystyrene (PS)) crack at lower temperatures, for example at about 420° C., than others (e.g. polyethene (PE)) which may crack at 450-480° C. Free radicals formed in the cracking of more reactive polymers such as PS may react with less reactive polymers such as PE, thereby causing them to crack effectively at lower reaction temperatures.

PE=polyethylene LDPE=Low density polyethylene

Polymer=a polymeric, plastic, elastomeric or rubber material or mixture of such materials.

Example 3.1

Thermosetting Polymer is ground to a powder and added to heavy oil and water. The mixture is stirred or passed through an emulsifier to form an intimately mixed emulsion of the components. The emulsion is optionally stored in a stirred holding tank as a buffer and then pressurized using a high-pressure pump. The mixture is pressurized using a high-pressure pump and is subsequently raised to the reaction temperature by means of a heater or series of heaters. The mixture is continuously pumped through a reaction vessel to give a residence time for cracking reactions to occur. At the end of the residence time the mixture is optionally cooled and then depressurized to a pressure close to atmospheric pressure in one or more depressurization steps. After depressurization the mixture of reaction products is separated into four main phases being a gas or vapour phase, an oil phase, a water phase and a solid phase. The oil phase contains the desired cracked oil products that can be separated from the water and solid phases by physical means widely known in the art for example centrifugation, decantation, filtration, and distillation.

The residence time is between about 1 minute and about 30 minutes (e.g. between about 1 minute and about 10 minutes). The reaction temperature is between about 380° C. and 480° C. (e.g. approximately 450° C., or approximately 400° C.). The initial mixture is between about 5% water by weight and about 30% water by weight. The polymer and heavy oil may be present in any proportion that gives rise to a pumpable slurry upon mixing. For example the mixture may consist of approximately; 10% by weight water, 1% by weight polymer and 89% by weight heavy oil, or 10% by weight water and 89% by weight polymer and 1% by weight heavy oil. The reaction pressure is between about 40 bar and about 300 bar.

Optionally one or more of the heaters is in the form of a heat exchanger which uses heat recovered from the cooling and/or depressurization of the reaction products, so as to reduce the amount of external heat input required to accomplish the processing of the feedstock.

Example 3.2

Polymer containing filler is ground to a powder and added to heavy oil and water. The mixture is stirred or passed through an emulsifier to form an intimately mixed emulsion of the components. The emulsion is optionally stored in a stirred holding tank as a buffer and then pressurized using a high-pressure pump. The mixture is pressurized using a high-pressure pump and is subsequently raised to the reaction temperature by means of a heater or series of heaters. The mixture is continuously pumped through a reaction vessel to give a residence time for cracking reactions to occur. At the end of the residence time the mixture is optionally cooled and then depressurized to a pressure close to atmospheric pressure in one or more depressurization steps. After depressurization the mixture of reaction products is separated into four main phases being a gas or vapour phase, an oil phase, a water phase and a solid phase. The filler originally present in the polymer is distributed between the solid phase and the aqueous phase. The oil phase contains the desired cracked oil products that can be separated from the water and solid phases by physical means widely known in the art for example centrifugation, decantation, filtration, and distillation.

The residence time is between about 1 minute and about 30 minutes (e.g. between about 1 minute and about 10 minutes). The reaction temperature is between about 380° C. and 480° C. (e.g. approximately 450° C., or approximately 400° C.). The initial mixture is between about 5% water by weight and about 30 water by weight. The polymer and heavy oil may be present in any proportion that gives rise to a pumpable slurry upon mixing. For example the mixture may consist of approximately; 10% by weight water, 1% by weight polymer and 89% by weight heavy oil, or 10% by weight water and 89% by weight polymer and 1% by weight heavy oil. The reaction pressure is between about 40 bar and about 300 bar.

Optionally one or more of the heaters is in the form of a heat exchanger which uses heat recovered from the cooling and/or depressurization of the reaction products, so as to reduce the amount of external heat input required to accomplish the processing of the feedstock.

Example 4; Plastic Upgrading in Supercritical Water

INTRODUCTION

Polymers (plastics) mixed with lignocellulosic biomass (wood flour) were cracked in supercritical water to make hydrocarbon oils. The mixtures simulate processing of end-of-life (EOL) plastics, which are typically mixtures of different polymers contaminated with paper, cardboard and other materials. Low density polyethylene (LDPE), polypropylene (PP), and polystyrene (PS) were mixed in varying proportions to simulate EOL plastic mix and wood flour was added to simulate a mixture of paper and cardboard.

A continuous flow hydrothermal unit with a capacity of at least 36 fluid (slurry) litres per hour was used. This unit is referred to as 'Small Pilot Plant' or 'SPP'. The hydrothermal reactor arrangement and process is referred to as 'Cat-HTR'.

Process Outline

Figure 5:
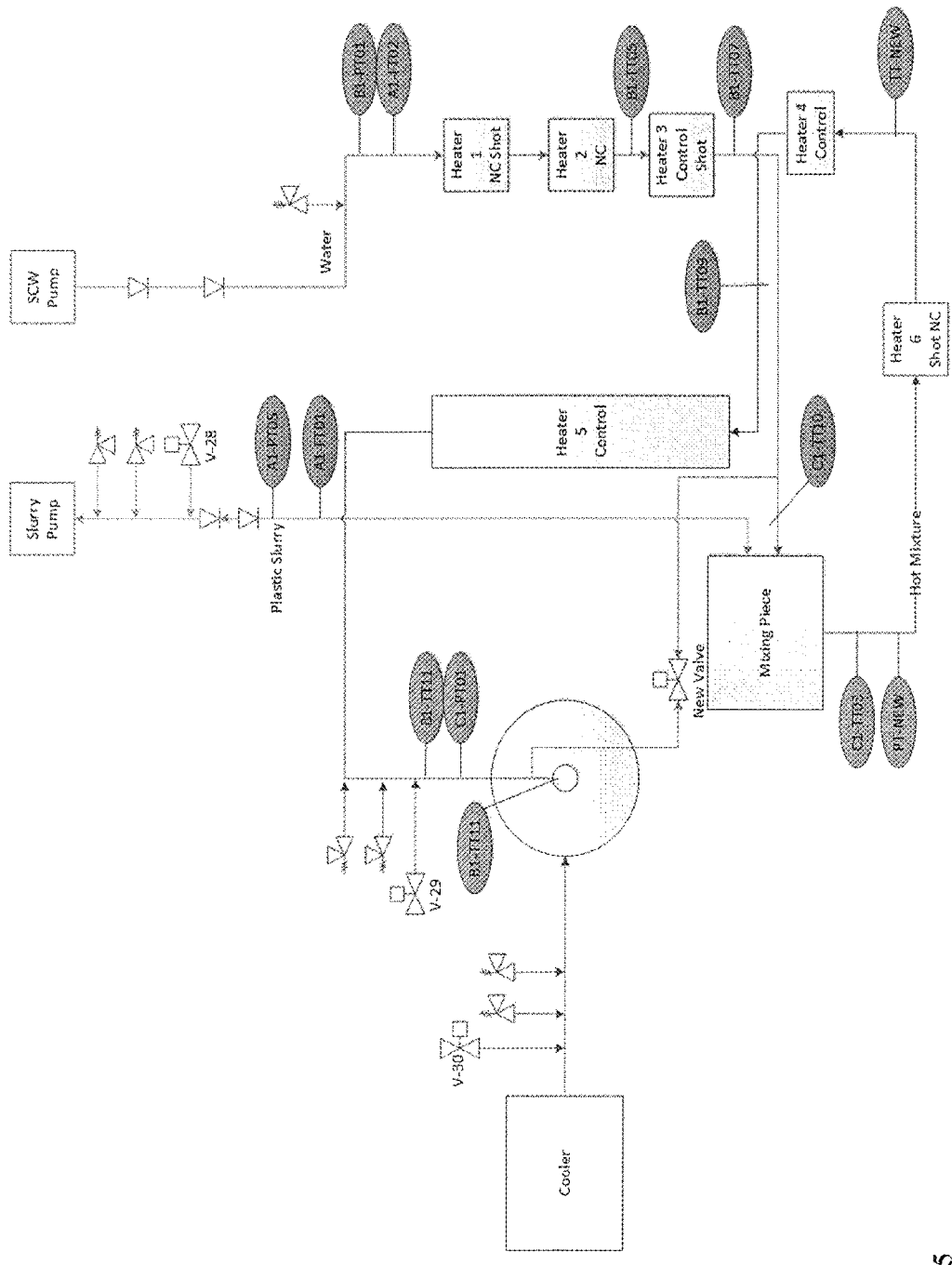
FIG. 5 is a simplified process flow diagram of a method according to the present invention.

A simplified process flow diagram of the Cat-HTR is shown in FIG. 5. Slurry starts at ambient temperature, and is heated to about 360° C. at the mixing piece by supercritical steam flow. The mixture is then further heated by electrical heaters 6, 4 and 5 until the desired reaction temperature is obtained and then pumped into the reactor shown by the concentric circles in FIG. 5. The reactor provides a residence time of approximately 8 minutes for the cracking reactions to occur.

- Process slurry is batch mixed prior to pilot plant operation at required concentration
- Pilot plant is operated with three distinct modes; start-up, slurry injection and shut-down.
- Start-up phase involves heating up the plant to reaction temperature and pressure using water in place of the plastic slurry.
- Once process stability on water is reached, governed by temperature and pressure over plant, operating moves to the next phase of slurry injection, by switching from water to slurry pumping.
- The slurry is injected in the mixing piece and mixed with supercritical water before going through another three heaters in series, before reaching the target temperature of about 440-445° C. The slurry then enters the reactor with a residence time of approximately 7 to 8 minutes.
- Product passes through the pressure let-down station to product receival tank. Product may also be pumped to the secondary product tank. On-line gas-sampling occurs prior to the gas treatment unit.
- Once desired amount of slurry has been injected, process fluid switches back to water and shut-down phase is initiated.

Shut-down phase allows for plant cool down and clearing of all product from process lines.

Feedstock Preparation

All plastics were milled and sieved to a particle size of less than 150 μm, with the exception of polystyrene, which was used at a particle size of less than 250 μm.

Radiata pine wood was milled and sieved to provide wood flour with a particle size less than 150 μm. Feedstocks used in this example set are shown in Table 8. The plastic powders were wetted with ethanol before slurrying in water in order to reduce their hydrophobicity and increase the ease of dispersion in water.

TABLE 8

Starting Feedstock blends (weight % dry basis (db))

|  | Run 1 | | Run 2 | | Run 3 | |
| --- | --- | --- | --- | --- | --- | --- |
|  | kg to feed tank (db) | % of dry feed | kg to feed tank (db) | % of dry feed | kg to feed tank (db) | % of dry feed |
| Polystyrene | 1.06 | 7.3 | 0 | 0 | 3.0 | 20 |
| Polypropylene | 7.35 | 50.5 | 7.07 | 46.7 | 6.0 | 40 |
| Low density Polyethylene | 2.10 | 14.4 | 3.00 | 20.0 | 1.0 | 6 |
| Wood Flour | 4.05 | 27.8 | 4.86 | 33.3 | 5.0 | 34 |
| Ethanol | 17.0 | | 23.0 | | 17.0 | |
| Water | 68.1 | | 58.67 | | 64.5 | |
| Total Solids | 14.6 | | 14.93 | | 15.0 | |
| Total Water | 68.6 | | 58.67 | | 64.5 | |
| Total to feed tank | 100.1 | | 96.60 | | 96.5 | |
| % Solids in slurry | 14.6 | | 15.23 | | 15.6 | |

Analysis of the wood flour used is given in Tables 9 and 10.

TABLE 9

Feedstock Proximate and Ultimate Analysis

| | Proximate Analysis | | | | Ultimate Analysis | | | | |
| --- | --- | --- | --- | --- | --- | --- | --- | --- | --- |
| Sample | Moisture (%)ar | Ash Yield | Volatile Matter | Fixed Carbon | C | H | N | S | O[1] |
| Radiata pine | 6.2 | 0.3 | 86.2 | 13.5 | 51.3 | 6.4 | <0.01 | 0.01 | 42 |
| Plastic-wood mix Run 1 | 1.6 | 0.3 | | | 76.6 | 11.9 | 0.04 | 0.02 | 11.2 |

All values are given as a weight % db (dry basis) unless otherwise noted
[1]Calculated by difference

TABLE 10

Feedstock ash composition

| | $SiO_2$ | $Al_2O_3$ | $Fe_2O_3$ | $TiO_2$ | $K_2O$ | MgO | $Na_2O$ | CaO | $SO_3$ | $P_2O_5$ |
| --- | --- | --- | --- | --- | --- | --- | --- | --- | --- | --- |
| Radiata pine | 8.3 | 1.6 | 3.2 | 0.14 | 13.8 | 4.9 | 0.7 | 28.9 | 1.1 | 4.4 |
| Plastic-wood mix Run 1 | 10.0 | 11.5 | 5.2 | 29.2 | 6.4 | 4.2 | 3.7 | 12.7 | 2.9 | 2.1 |

| | BaO | SrO | CuO | MnO | $Cr_2O_3$ | ZnO | $V_2O_5$ | $Co_3O_4$ | NiO |
| --- | --- | --- | --- | --- | --- | --- | --- | --- | --- |
| Radiata pine | 0.4 | 0.1 | <0.1 | 4.0 | <0.1 | 0.5 | <0.1 | <0.1 | <0.1 |
| Plastic-wood mix Run 1 | 0.02 | 0.03 | 0.03 | 0.59 | 0.02 | 3.8 | <0.01 | 0.02 | 0.01 |

All values are given as a weight % oxide in ash on a dry basis

Hydrothermal Cracking

Processing conditions were as shown as in Table 11.

TABLE 11

Processing Conditions

| Run # | Pressure Range (barg) | Temperature (° C.) | Slurry Concentration. (% db) |
|---|---|---|---|
| 1 | 240-280 | 440 | 14.0 |
| 2 | 240-280 | 445 | 15.2 |
| 3 | 240-280 | 440 | 17.0 |

Products of Hydrothermal Cracking

Products from the hydrothermal cracking of feed were gases/vapours, a waxy hydrocarbon oil, and an aqueous phase containing organic and inorganic dissolved materials. A small amount of solid hydrocarbon material consisting of polymers nut fully cracked into an oil phase was also recovered.

The organic material contained in the aqueous phase also constitutes an emulsified and/or dissolved hydrocarbon phase that can be recovered by various means known in the art including liquid-liquid extraction (LLE) with solvents. Diethyl ether was used for LLE of the hydrocarbons dissolved in the aqueous phase.

The approximate relative distribution of products obtained is given in Table 12.

TABLE 12

Product Distribution

| Run # | 1 | 2 | 3 |
|---|---|---|---|
| Oil | 55 | 57.3 | 52.8 |
| Gas | 20 | 12 | 16.6 |
| Oil from aqueous phase by LLE | 14 | 20 | 21 |
| Other aqueous solutes | 1 | 0.7 | 0.6 |
| Partly cracked polymers (waxy solids) | 10 | 10 | 9 |
| Total | 100 | 100 | 100 |

Properties of the Products

Certain properties of the oil product are shown in Table 13. GCV stands for gross calorific value. The high calorific value of the oil indicates that is composition is dominated by paraffinic hydrocarbons. For example the calorific value of dodecane is 47.47 MJ/kg.

TABLE 13

Oil Gross Calorific Value

| Run # | GCV (MJ/kg) |
|---|---|
| 1 | 45.0 +/− 1.5 |
| 2 | 46.0 +/− 1.0 |
| 3 | 44.7 +/− 0.5 |

Certain properties of the aqueous phase are shown in Table 14.

TABLE 14

Aqueous phase product parameters

| Parameter | Unit | Run #1 |
|---|---|---|
| Benzene | μg/l | 290 |
| Toluene | μg/l | 9500 |
| Ethylbenzene | μg/l | 24000 |
| m/p-xylene | μg/l | <500 |
| o-xylene | μg/l | <250 |
| naphtalene | μg/l | <250 |
| Total BTEX | μg/l | 34,000 |
| TRH C6-C10 | μg/l | 84000 |
| TRH C6-C9 | μg/l | 83000 |
| TRH C6-C10 minus BTEX | μg/l | 50000 |
| TRH C10-C14 | μg/l | 74000 |
| TRH C15-C28 | μg/l | 87000 |
| TRH C29-C36 | μg/l | 13000 |
| TRH C37-C40 | μg/l | 4500 |
| Total PAH | μg/l | <20 |
| Biological Oxygen Demand BOD5 | mg/l | 62,000 |
| Chemical Oxygen Demand | mg/l | 78,000 |
| Total Organic Carbon | mg/l | 24,000 |
| Total Dissolved Solids | mg/l | 1,400 |
| pH | | 3.7 |
| Chloride | mg/l | 4.8 |
| Total Sulphur | mg/l | 4.0 |
| Calcium | mg/l | 3.6 |
| Magnesium | mg/l | 0.7 |
| Sodium | mg/l | 14 |
| Potassium | mg/l | 7.3 |

Certain properties of the gas phase on a dry, air free basis are shown in Table 15. Compositions in volume %.

TABLE 15

Gaseous phase compositions, dry, air free volume % basis

| Run # | CO | $CO_2$ | $H_2$ | $H_2S$ | Methane | Ethane | Propane | Butane | Pentane |
|---|---|---|---|---|---|---|---|---|---|
| 1 | 17.72 | 40.59 | 1.87 | <0.1 | 16.5 | 3.98 | 0.87 | 3.85 | 2.58 |

The gas is notable for its high calorific value based on its components and could readily be burned to provide process energy.

Boiling Range of the Oil Product

Figure 6:
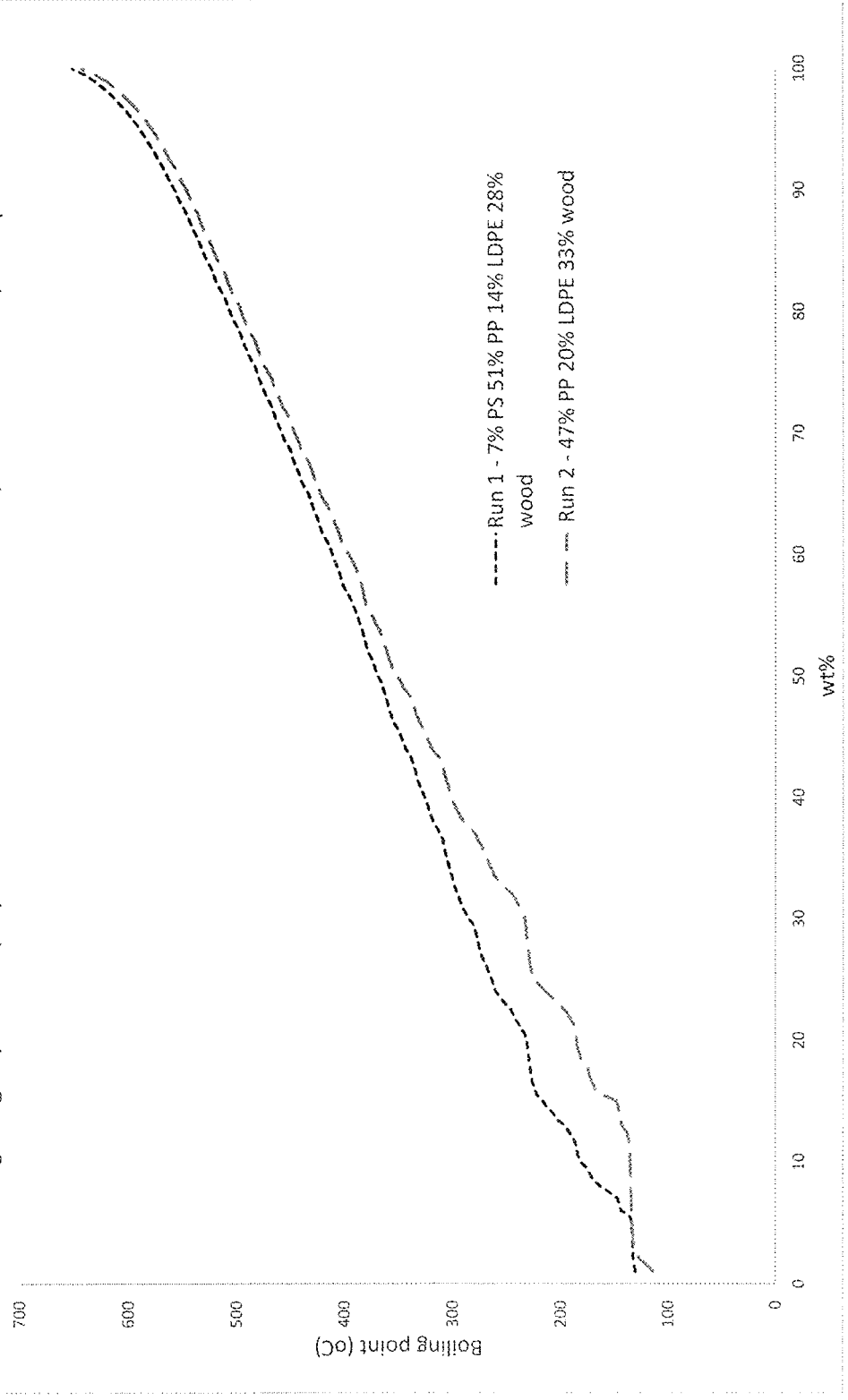
FIG. 6 shows boiling point curves for oil products produced using a method according to the present invention.

FIG. 6 shows simulated distillation (SIMDIS) boiling curves by gas chromatograph for the oil product from runs 1 and 2 of Example 4.

Example 5; Cracking of Used Lubrication Oil/Oil Residue with and without Substrate A method of the present invention was conducted with particular reference to cracking of used lubricating oil, residue from distillation of used lubricating oil, and the use of substrate.

Experimental Description (Non-Prophetic)

Figure 7:
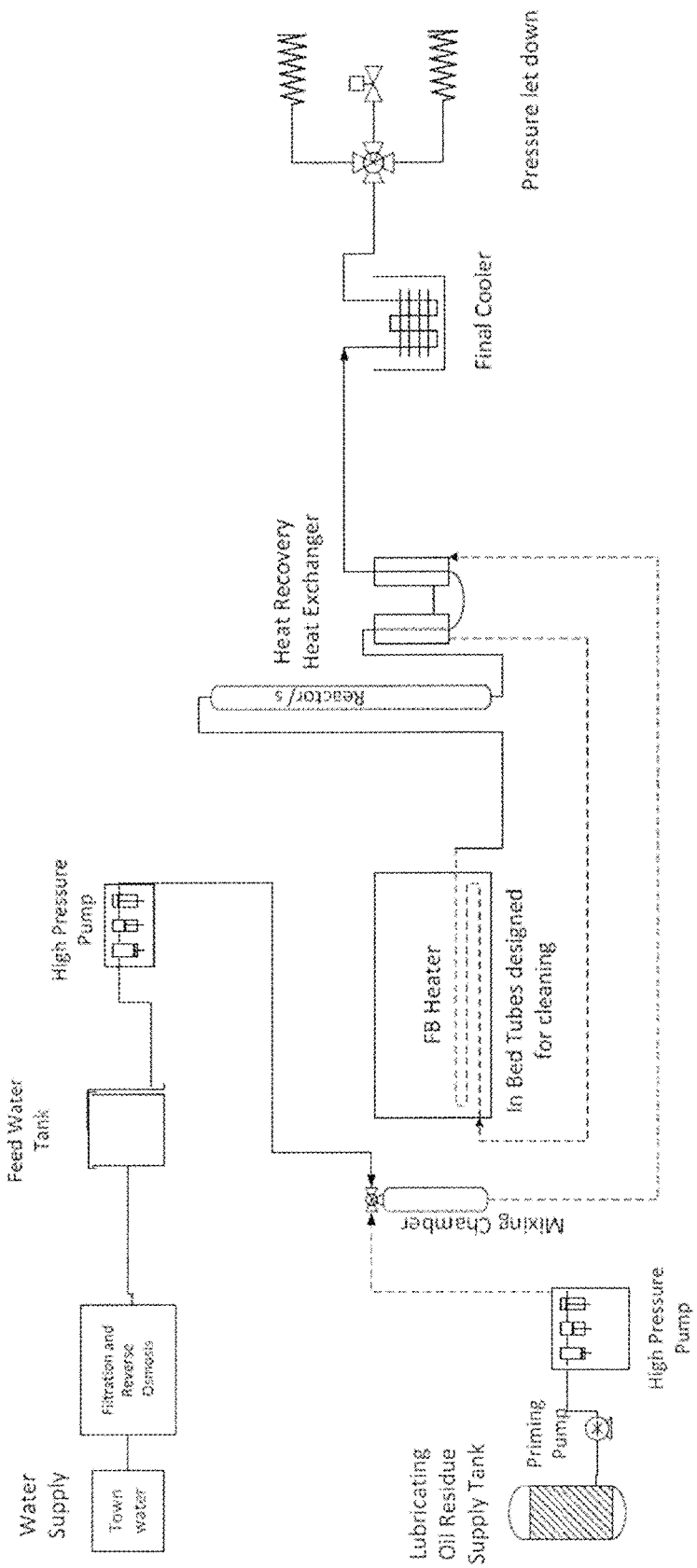
FIG. 7 is a simplified process flow diagram of a method according to the present invention.

FIG. 7 shows a diagram of an apparatus suitable for the method. In the present Example a variation of this apparatus was used. The water line at the top right of FIG. 7 and the mixing chamber were omitted. Heavy oil and water and substrate (if used) were mixed in the LOR mixing tank. The LOR mixing tank was heated to reduce the viscosity of the ULO and/or ULOR and enable good mixing with water. Preferably a high shear mixer is used to enable formation of an intimately mixed emulsion of ULO and/or ULOR and water and optionally, substrate. The mixture was pressurized by means of the priming pump and then by means of the high pressure pump, and pumped into the heat exchanger. The mixed feed was fed under pressure into heat exchanger to pre-heat the mixture to about 300° C., after which it was fed into a coiled tube heated by a fluidized bed (FB) heater, where it was raised to a reaction temperature of between about 380° C. and about 500° C. During this time cracking of the heavy oil feed started to occur. The mixture was then fed to a reactor unit that is designed to allow a prescribed residence time for the cracking reactions to reach the desired level of completion. The fluidized bed coil has straight tube lengths and end caps linking them so that it can be periodically disassembled for cleaning of the interior of the coil. Heat energy was then recovered from the hot process stream by means of a tube in tube recovery heat exchanger that captured energy from the hot fluid and transferred that energy into the incoming feed from the high pressure pump. During this step the processed fluid was cooled to about to 150° C. The fluid was then passed to a final cooler where it was cooled by water to about 80° C. Water from this step was recovered to make feed slurry. The product mixture passed from the final cooler to a pressure-let down system. The pressure let down system consisted of capillary tubes or pressure let down valves or a combination thereof. The processed mixture was then passed to a centrifuge where water-insoluble product oil and an aqueous phase consisting mainly of water were separated. The product oil was then analysed. ULOR at about 80° C. and water at about 75° C. were mixed in proportions of 20% water; 80% ULOR to 80% water; 20% ULOR. For some runs lignite was added to the ULO/ULOR feed tank as a solid substrate. The amount of lignite added was about 5-15% of the heavy oil by weight. In other runs lubricating oil was used as the feed at a ratio of 25% lubricating oil to 75% water by weight. The residence time of the fluid in apparatus at high temperature was about 2 minutes to about 20 minutes in the present Example.

Experimental Description (Prophetic)

A (prophetic) variation of the method above now follows, again with reference to FIG. 7. Used lubricating oil (ULO) and/or residue from distillation of used lubricating oil (Used lubricating oil residue, ULOR) may be mixed with water. As shown in FIG. 7, ULO and/or ULOR may be mixed with water by pumping ULO and/or ULOR and water as separate streams into a mixing chamber designed to intimately mix the two streams and form a water in oil or oil-in-water emulsion or a mixed stream of heavy oil and water. As shown in FIG. 7 the pumps feeding the mixing chamber may be high pressure pumps, capable of pressurizing the feeds at up to about 300 bar and preferably at about 240 to 260 bar. The ULO/ULOR in the feed tank may be heated to about 80° C. to about 150° C. to reduce the viscosity of the heavy oil feed. The water feed may be at a temperature between ambient temperature and about 90° C. The high pressure pump for the oil may be fed by a priming pump suitable for high viscosity oils. The mixed feed may be fed under pressure into heat exchanger to pre-heat the mixture to about 300° C., after which it is fed into a coiled tube heated by a fluidized bed (FB) heater, where it may be raised to a reaction temperature of between about 380° C. and about 500° C. During this time cracking of the heavy oil feed may start to occur. The mixture may then be fed to a reactor unit that is designed to allow a prescribed residence time for the cracking reactions to reach the desired level of completion. Optionally the reactor unit may be omitted and the cracking reactions may be carried out in the fluidized bed coil. The fluidized bed coil may be designed with straight tube lengths and end caps linking them so that it can be periodically disassembled for cleaning of the interior of the coil. Heat energy may then be recovered from the hot process stream by means of a tube in tube recovery heat exchanger that captures energy from the hot fluid and transfers that energy into the incoming feed from the mixing chamber. During this step the processed fluid may be cooled to about to 150° C. The fluid may be then passed to a final cooler where it may be cooled by water to about 80° C. Water from this step may be recovered to make feed slurry. The product mixture may pass from the final cooler to a pressure-let down system. The pressure let down system can consist e.g. of capillary tubes or pressure let down valves or a combination thereof. The processed mixture may then be passed to a centrifuge where water-insoluble product oil and an aqueous phase consisting mainly of water may be separated. Optionally lignite may be added to the ULO/ULOR feed tank as a solid substrate. The amount of lignite added may be about 5-15% of the heavy oil by weight.

Processing Conditions

The following conditions were used according to the non-prophetic experimental description of this Example stated above.

Feeds and Processing Conditions

Table 16 shows a range of feeds and processing conditions.

TABLE 16

Feeds and Process conditions

| Run # | Heavy oil type | Heavy Oil fraction wt % | water wt % | substrate type | substrate wt % | Temperature deg C | Pressure Bar | Flow Kg/hour |
|---|---|---|---|---|---|---|---|---|
| 1 | ULOR | 80 | 20 | | | 380 | 240 | |
| 2 | ULOR | 80 | 20 | | | 440 | 240 | |
| 3 | ULOR | 20 | 80 | | | 430 | 235 | 130 |
| 4 | ULOR | 20 | 80 | | | 415 | 220 | 160 |
| 5 | ULOR | 20 | 80 | | | 410 | | |
| 6 | ULOR | 50 | 50 | | | 380 | 230 | |
| 7 | ULOR | 50 | 50 | | | 390 | | 150 |
| 8 | ULOR | 50 | 50 | | | 390 | | |
| 9 | ULOR | 50 | 50 | | | 385 | 235 | 170 |
| 10 | ULOR | 50 | 50 | | | 385 | 235 | 170 |
| 11 | ULOR | 50 | 50 | | | 400 | 245 | 150 |
| 12 | ULOR | 50 | 50 | | | 390 | 230 | 150 |
| 13 | ULOR | 50 | 50 | | | 390 | 230 | 150 |
| 14 | ULOR | 20 | 80 | | | 415 | 225 | |
| 15 | Lubricating Oil | 75 | 25 | | | 410 | 230 | 180 |
| 16 | Lubricating Oil | 75 | 25 | | | 420 | 238 | 180 |
| 17 | Lubricating Oil | 75 | 25 | | | 430 | 240 | 180 |
| 18 | ULOR | 40 | 60 | | | 415 | 240 | 180 |
| 19 | ULOR | 40 | 60 | | | 420 | 240 | 180 |
| 20 | ULOR | 40 | 55 | Lignite | 5 | 380-420 | 240 | 180 |
| 21 | ULOR | 30 | 65 | Lignite | 5 | 380-420 | 240 | 180 |
| 22 | Lubricating Oil 2 | 75 | 25 | | | 420 | 240 | 180 |
| 23 | Lubricating Oil 2 | 75 | 25 | | | 430 | 240 | 180 |

ULOR = used lubricating oil (distillation) residue. Feedstock percentages are on a dry basis.

Results

The following results were obtained according to the non-prophetic experimental description and processing conditions described in this Example.

Reduction in Density and Viscosity of Product through Cracking

Table 17 shows the reduction in viscosity and density caused by cracking for ULOR processed at 420° C. compared to the ULOR feed.

TABLE 17 reduction in viscosity and density caused by cracking for ULOR

| Material | Kinematic Viscosity/cS | Density/g/ml at 15° C. |
|---|---|---|
| ULOR (feed) | 4,630 at 40° C., >10,000 at 20° C. | 0.95 |
| Product Oil | 160 at 20° C. | 0.9072 |

Table 18 shows the reduction in viscosity and density caused by cracking lubricating oil at different temperatures, compared to the feed.

TABLE 18 reduction in viscosity and density caused by cracking lubricating oil

| Material | Processing temperature/° C. | Kinematic viscosity at 40° C./cS | Density/ g/ml |
|---|---|---|---|
| Lubricating Oil (feed) | | 30.08 | 0.840 |
| Product oil | 410 | 22.76 | 0.8368 |
| Product oil | 420 | 19.70 | 0.8352 |
| Product oil | 430 | 15.74 | 0.8330 |

Change in Boiling Range to Lower Boiling Points Through Cracking

Figure 8A:
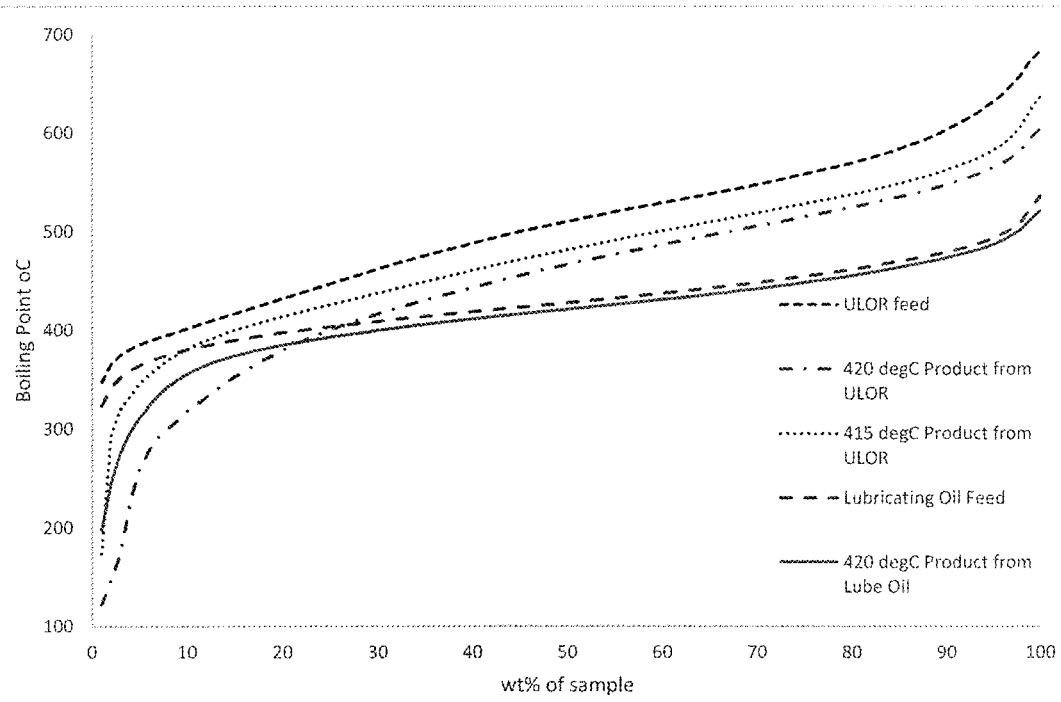
FIG. 8A shows a boiling range curve from simulated distillation (SIMDIS) of feedstock and cracked products treated or generated according to a method of the present invention, in this case, lubricating oil residue (ULOR) and lubricating oil.
Figure 8B:
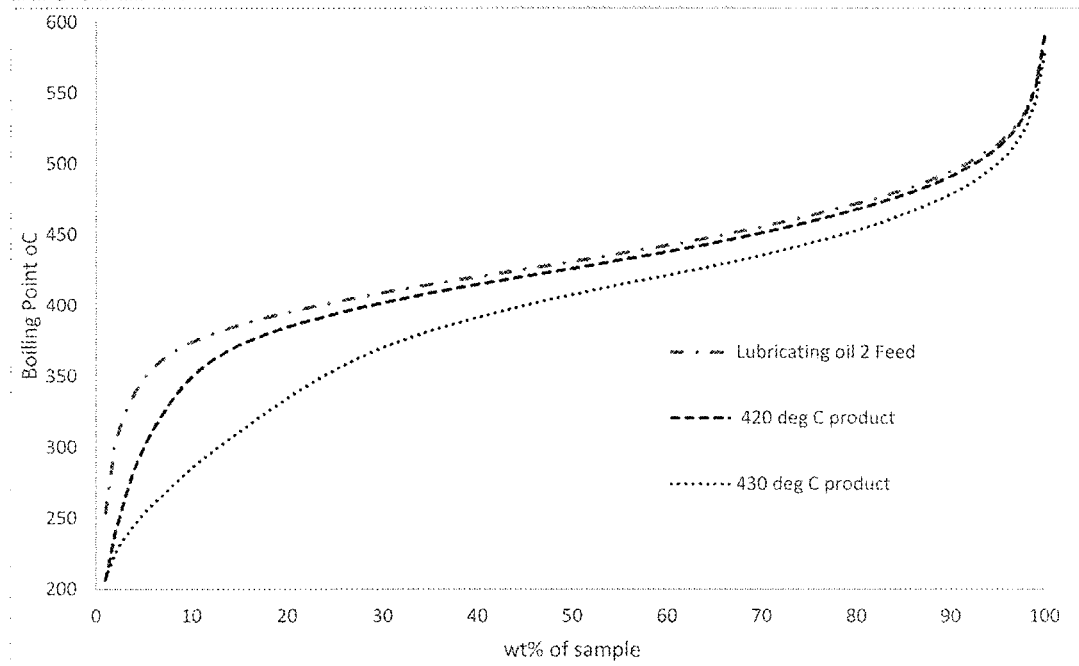
FIG. 8B shows a boiling range curve from SIMDIS of feedstock and cracked products treated or generated according to a method of the present invention, in this case, second lubricating oil.

FIGS. 8A-C show boiling range curves obtained by simulated distillation of feed and product samples in a gas chromatograph (SIMDIS). It can be seen, for example by the proportion of the material boiling below 400° C., or the boiling point at the 50th percentile, that the boiling point (range) of the products are lower than the comparable feeds as a result of cracking by a method of the invention. FIG. 8A corresponds to feedstock, products and conditions in Runs 18 and 19 of Table 16, and to feedstock, products and conditions in Runs 16 and 17 of Table 16. FIG. 8B corresponds to feedstock, products and conditions in Runs 22 and 23 of Table 16. FIG. 8C corresponds to feedstock, products and conditions in Run 21 of Table 16 and specifically to an extended period of 4-8 hours duration in which the temperature was 410° C. The two product samples in FIG. 8C were taken at different times during the run.

Demetallization of Used Lubrication Oil Residue (ULOR)

Oil-soluble metal compounds, e.g. calcium and magnesium sulphonates and zinc dialkyldithiophosphates that are a common component of lubrication oils, are removed from the product oil by the methods of the present invention. Without being bound by theory, it is thought that the organic anions and ligands that solubilize the metals in oil may be degraded by the process, e.g. by breaking (cracking) of carbon-carbon, carbon-sulphur and zinc-sulphur bonds, to the extent that the metals are no longer oil-soluble and consequently precipitate or dissolve in the aqueous phase.

Exemplifying this, FIG. 9 shows the extent of removal of certain metals as a function of processing temperature for ULOR feed processed according to the conditions of the present Example. The x-axis label shows the temperature of processing followed by the ratio by weight of ULOR to water in the feed. For ease of display, sodium concentrations are displayed in the Figure as 1/10th of their actual values. Furthermore the Calcium (Ca) concentration for the "380 degC 50:50" sample has also been displayed as 1/10th of the actual value. The metals content of the feed ULOR was Zn; 508 mg/l, Na: 1,832 mg/l, Mg; 276 mg/l, Ca; 6,916 mg/l.

Example 6; Cracking of 'End of Life' Polymers and Plastics, or Mixed Plastic Waste Example 6 is a prophetic Example.

Figure 10:
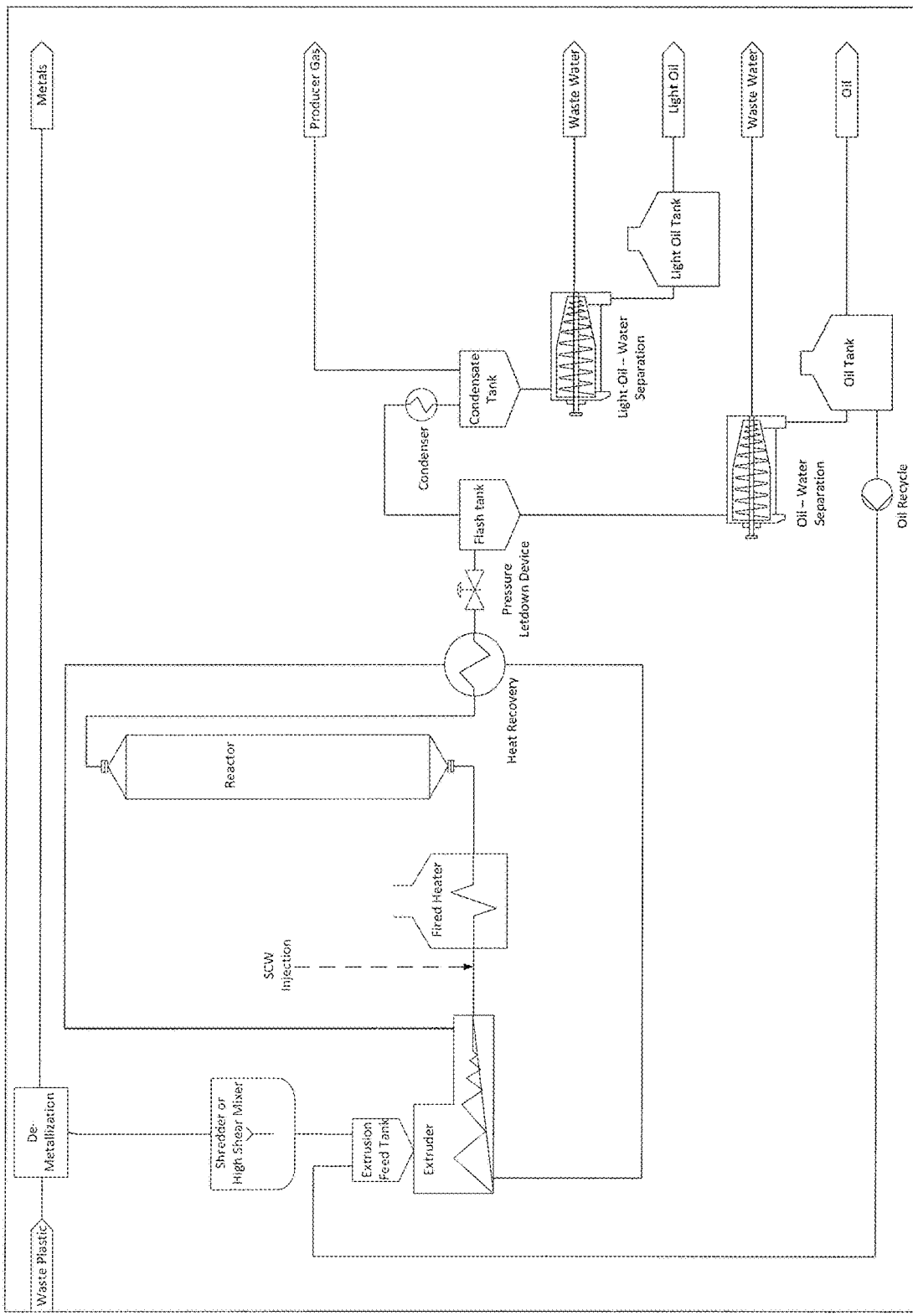
FIG. 10 is a simplified process diagram of a method according to the present invention.

FIG. 10 shows an apparatus suitable for the method. End of Life Plastics or Mixed waste plastics, containing for example 30-90% by weight dry basis mixed polymers including polyethylene and/or polypropylene, and/or polystyrene and/or poly(vinyl chloride), 10-50% by weight dry basis cardboard and/or paper, and 0-10% metallic material by weight dry basis, may be demetalized and then densified by means known in the art. For example, the feed material may be passed through a shredder to produce particles of an appropriate size. Shredded material may be treated with a magnetic separator to remove magnetic metals and/or an eddy current separator to remove non-magnetic metals. Following demetalization, the material may be densified using, for example, a screw press or a high intensity mixer/agglomerator. The feed may contain for example 5-50% by weight water (wet basis) that is energetically costly to remove by drying. An advantage of this method is that the water does not need to be removed. Optionally some water may be removed at the densification stage by means known in the art e.g. a screw press. The densified material may then be fed into an extruder and extruded into a pressurized system at a temperature of about 200-300° C. The extruded material may then be contacted by supercritical water at a mixing piece to produce a temperature in the reaction mixture of 400-480° C. (e.g. 420° C.). Oil (e.g. used lubricating oil) may be added at the extrusion stage and/or at the mixing piece. The mixture may then be passed to a heating unit to further increase the temperature of the fluid, for example to between 420° C. and 450° C. Optionally, the heater may be omitted. The mixture, once heated to reaction temperature, may pass to a reactor unit to provide residence time for cracking reactions to occur. The reaction products may be depressurized. The product may be a hydrocarbon oil. For example the major product may be a hydrocarbon oil boiling mainly between about 150° C. and 370° C.

The invention claimed is:

1. A method for converting a polymeric feedstock into a product, the method comprising the stages of:
   a) generating a supercritical aqueous solvent,
   b) contacting a mixture of
      (i) the polymeric feedstock,
      (ii) any one or more of lignite, lignocellulosic biomass, plant gum, plant resin, plant tar, plant pitch, and
      (iii) an aqueous solvent,
   with the supercritical aqueous solvent to form a reaction mixture;
   c) treating the reaction mixture at a temperature of between 440° C. and 480° C. and at a pressure of between 240 bar and 280 bar for a time period of between 1 and 60 minutes, and
   d) depressurizing the treated reaction mixture to directly obtain a product, wherein the product comprises bio-oil, and
   wherein;
   the mixture comprises at least 40% wt/wt of the polymeric feedstock, and
   the polymeric feedstock is selected from the group consisting of Polyethylene (PE), Low Density Polyethylene (LDPE), High Density Polyethylene (HDPE), Polypropylene (PP), Polyester, Poly(ethylene terephthalate) (PET), Poly(lactic acid) (PLA), Poly(vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly (Melamine formaldehyde) (MF), Poly(Phenol-formaldehyde) (PF), Epoxies, Polyacetal, Acetal, Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), polymer polycondensate, Polyetheretherketone (PEEK), Polyetherimide (PEI), Polyethersulfone (PES), Polyethylenechlorinates (PEC), Polyimide (PI), Polymethylpentene (PMP), Poly(phenylene Oxide) (PPO), Polyphenylene Sulfide (PPS), Polyphthalamide (PTA), Polysulfone (PSU), Polyurethane (PU), Poly (vinylidene chloride) (PVDC), Poly(tetrafluoroethylene) (PTFE), Poly(fluoroxy alkane) (PFA), Poly(siloxanes), silicones, thermoplastics, thermosetting polymers, natural rubbers, tyre rubbers, ethylene propylene diene monomer rubbers (EPDM), chloroprene rubbers, acrylonitrile butadiene (nitrile) rubbers, polyacrylate rubbers, Ethylene Acrylic rubbers, Styrene-butadiene rubbers, Polyester urethane rubbers, Polyether urethane rubbers, Fluorosilicone rubbers, silicone rubbers, and copolymers and mixtures thereof.

2. The method according to claim 1, wherein the mixture is a slurry or emulsion under continuous flow during said treating.

3. The method according to claim 1, wherein the mixture comprises an additive catalyst selected from the group consisting of; a base catalyst; an acid catalyst; a water-gas-shift catalyst; an alumino-silicate catalyst; a sulphide catalyst; and any combination thereof, wherein the additive catalyst is not derived from any other component of the mixture or a reactor apparatus component.

4. The method according to claim 3, wherein the additive catalyst is selected from the group consisting of sodium hydroxide, potassium hydroxide, sodium carbonate, potassium carbonate, sodium formate, potassium formate, an iron salt, or any combination thereof.

5. The method according to claim 3, wherein the additive catalyst is added to the mixture after the mixture has been heated to more than 300° C., more than 350° C., more than 360° C., more than 370° C., or more than 374° C.

6. The method according to claim 3, wherein the additive catalyst is added to the mixture after the mixture has been pressurized to more than 50 bar, more than 100 bar, more than 150 bar, or more than 200 bar, or more than 221 bar.

7. The method according to claim 1, wherein the mixture further comprises a solid substrate that is either or both of:
   (i) solid or substantially solid at the temperature and the pressure;
   (ii) inert or substantially inert at the temperature and the pressure.

8. The method according to claim 7, wherein the solid substrate is
   (i) a carbonaceous material comprising at least 50%, at least 60%, at least 70%, at least 80%, or at least 90% by weight carbon; or
   (ii) a non-carbonaceous material comprising no more than 10%, no more than 5%, no more than 1%, or no carbon.

9. The method according to claim 7, wherein the solid substrate is selected from the group consisting of; coals, anthracitic coal, meta-anthracite, anthracite semianthracite, bituminous coal, subbituminous coal, lignite, coking coal, coal tar, coal tar derivatives, coal char, coke, high temperature coke, foundry coke, low and medium temperature coke, pitch coke, petroleum coke, coke oven coke, coke breeze, gas coke, brown coal coke, semi coke, charcoal, pyrolysis char, hydrothermal char, carbon black, graphite fine particles, amorphous carbon, carbon nanotubes, carbon nanofibers, vapor-grown carbon fibers, fly ash, a mineral, calcium carbonate, calcite, a silicate, silica, quartz, an oxide, a metal oxide, an insoluble or substantially insoluble metal salt, iron ore, a clay mineral, talc, gypsum, carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, and hydrogen carbonates of magnesium.

10. The method according to claim 7, wherein the solid substrate is present in the mixture at a concentration of more than 0.5%, more than 1%, more than 3%, more than 5%, more than 10%, more than 15%, more than 20%, more than 25%, or more than 30% by weight.

11. The method according to claim 1, wherein:
(i) gases released during said depressurizing are used as syngas for production of hydrocarbons; and/or
(ii) polar and non-polar liquids in the product are separated by distillation followed by physical apparatus; and/or
(iii) polar and non-polar liquids in the product are separated by fractional distillation followed by any one or more of decantation, centrifugation, or gravitational apparatus.

12. The method according to claim 1, wherein the polymeric feedstock is ground prior to inclusion in the mixture.

13. The method according to claim 1, wherein the mixture is emulsified after inclusion of the polymeric feedstock.

14. The method according to claim 1, wherein the time period is (i) less than about; 60 minutes, 45 minutes, 30 minutes, 25 minutes, 20 minutes, 15 minutes, 10 minutes or 5 minutes; (ii) more than about; 45 minutes, 30 minutes, 25 minutes, 20 minutes, 15 minutes, 10 minutes, 2 minutes, or 5 minutes; or (iii) between about; 5 minutes and 45 minutes, 5 minutes and 35 minutes, 10 minutes and 35 minutes, 15 minutes and about 30 minutes, or 20 minutes and 30 minutes.

15. The method according to claim 1, wherein the polymeric feedstock does not contain heavy oil or heavy oil residue.

16. The method according to claim 1, wherein the mixture is pressurized and/or heated by an extruder.

* * * * *